(12) United States Patent
Martin et al.

(10) Patent No.: US 11,353,967 B2
(45) Date of Patent: Jun. 7, 2022

(54) INTERACTING WITH A VIRTUAL ENVIRONMENT USING A POINTING CONTROLLER

(71) Applicant: ARKH Litho Holdings, LLC, Dallas, TX (US)

(72) Inventors: Nathaniel James Martin, London (GB); Charles James Bruce, London (GB)

(73) Assignee: ARKH Litho Holdings, LLC, Dallas, TX (US)

( * ) Notice: Subject to any disclaimer, the term of this patent is extended or adjusted under 35 U.S.C. 154(b) by 0 days.

(21) Appl. No.: 17/059,183

(22) PCT Filed: May 30, 2019

(86) PCT No.: PCT/IB2019/054490
§ 371 (c)(1),
(2) Date: Nov. 25, 2020

(87) PCT Pub. No.: WO2019/229698
PCT Pub. Date: Dec. 5, 2019

(65) Prior Publication Data
US 2021/0208698 A1     Jul. 8, 2021

Related U.S. Application Data

(60) Provisional application No. 62/678,987, filed on May 31, 2018, provisional application No. 62/678,989, (Continued)

(51) Int. Cl.
*G06F 3/0346*     (2013.01)
*G06F 3/01*     (2006.01)
(Continued)

(52) U.S. Cl.
CPC ............ *G06F 3/0346* (2013.01); *G06F 3/012* (2013.01); *G06F 3/014* (2013.01); *G06F 3/017* (2013.01);
(Continued)

(58) Field of Classification Search
CPC ........ G06F 3/0346; G06F 3/012; G06F 3/014; G06F 3/017; G06F 3/03547;
(Continued)

(56) References Cited

U.S. PATENT DOCUMENTS

| | | |
|---|---|---|
| 5,945,978 A | 8/1999 | Holmes |
| 7,215,321 B2 | 5/2007 | SanGiovanni |

(Continued)

FOREIGN PATENT DOCUMENTS

WO    WO 2015/113503 A1    8/2015

OTHER PUBLICATIONS

PCT International Search Report and Written Opinion, PCT/IB2019/054490, dated Nov. 8, 2019, 12 Pages.

*Primary Examiner* — Ariel A Balaoing
(74) *Attorney, Agent, or Firm* — Conley Rose, P. C.; Grant Rodolph; Robert E. Kent

(57) ABSTRACT

A pointing controller enables interaction with virtual objects in a virtual or augmented reality environment. The pointing controller comprises a form factor that enables it to be securely positioned in the user's fingers during a pointing gesture. The pointing controller tracks a pointing direction in three-dimensional space based on motion of the pointing controller. The pointing controller furthermore includes one or more control elements such as buttons or touch interfaces to enable additional interactions.

20 Claims, 17 Drawing Sheets

Related U.S. Application Data filed on May 31, 2018, provisional application No. 62/737,088, filed on Sep. 26, 2018, provisional application No. 62/740,411, filed on Oct. 2, 2018.

(51) Int. Cl.
*G06F 3/0354* (2013.01)
*G06F 3/04815* (2022.01)

(52) U.S. Cl.
CPC ...... *G06F 3/03547* (2013.01); *G06F 3/04815* (2013.01); *G06F 2203/0331* (2013.01); *G06F 2203/0339* (2013.01); *G06F 2203/0384* (2013.01)

(58) Field of Classification Search
CPC ......... G06F 3/04815; G06F 2203/0331; G06F 2203/0339; G06F 2203/0384
See application file for complete search history.

(56) References Cited

U.S. PATENT DOCUMENTS

| | | |
|---|---|---|
| 7,716,586 B2 | 5/2010 | Dieberger et al. |
| 8,031,172 B2 | 10/2011 | Kruse et al. |
| 8,232,976 B2 | 7/2012 | Yun et al. |
| 8,378,795 B2 | 2/2013 | Steger et al. |
| 8,508,472 B1 | 8/2013 | Wieder |
| 8,570,273 B1 * | 10/2013 | Smith ................ G06F 3/03547 345/156 |
| 8,599,152 B1 | 12/2013 | Wurtenberger et al. |
| 8,698,764 B1 | 4/2014 | Karakotsios et al. |
| 8,799,803 B2 | 8/2014 | Amm |
| 8,809,716 B2 | 8/2014 | Gohng et al. |
| 8,830,163 B2 | 9/2014 | Sim et al. |
| 8,860,763 B2 | 10/2014 | Privault et al. |
| 9,030,424 B2 | 5/2015 | Shih et al. |
| 9,141,148 B2 | 9/2015 | Richter et al. |
| 9,141,272 B1 | 9/2015 | Cleron et al. |
| 9,229,540 B2 | 1/2016 | Mandella et al. |
| 9,268,483 B2 | 2/2016 | Dennis et al. |
| 9,330,545 B2 | 5/2016 | Kempin et al. |
| 9,335,790 B2 | 5/2016 | Stotler |
| 9,335,823 B2 | 5/2016 | Modarres et al. |
| 9,383,839 B1 | 7/2016 | Rost et al. |
| 9,412,002 B2 | 8/2016 | Magi |
| 9,446,665 B2 | 9/2016 | Abel et al. |
| 9,474,580 B2 | 10/2016 | Hannaford et al. |
| 9,535,550 B2 | 1/2017 | Levesque et al. |
| 9,535,557 B2 | 1/2017 | Bernstein et al. |
| 9,547,366 B2 | 1/2017 | Ullrich et al. |
| 9,600,076 B2 | 3/2017 | Levesque et al. |
| 9,600,083 B2 | 3/2017 | Levesque et al. |
| 9,606,624 B2 | 3/2017 | Cruz-Hernandez et al. |
| 9,645,647 B2 | 5/2017 | Levesque |
| 9,690,377 B2 | 6/2017 | Lee et al. |
| 9,690,381 B2 | 6/2017 | Levesque et al. |
| 9,690,382 B1 | 6/2017 | Moussette et al. |
| 9,696,822 B2 | 7/2017 | Dow et al. |
| 9,713,500 B2 | 7/2017 | Kim et al. |
| 9,746,921 B2 | 8/2017 | Mallinson |
| 9,746,933 B2 | 8/2017 | Burba et al. |
| 9,778,813 B2 | 10/2017 | Shenfield et al. |
| 9,785,123 B2 | 10/2017 | Mansour et al. |
| 9,792,272 B2 | 10/2017 | Hicks |
| 9,798,388 B1 | 10/2017 | Murali |
| 9,830,782 B2 | 11/2017 | Morrell et al. |
| 9,880,697 B2 | 1/2018 | Anderson et al. |
| 9,891,709 B2 | 2/2018 | Heubel |
| 9,904,409 B2 | 2/2018 | Lee et al. |
| 9,927,902 B2 | 3/2018 | Burr et al. |
| 9,939,963 B2 | 4/2018 | Beckman |
| 9,945,818 B2 | 4/2018 | Ganti et al. |
| 9,946,505 B2 | 4/2018 | Becze et al. |
| 9,965,033 B2 | 5/2018 | Park et al. |
| 10,007,772 B2 | 6/2018 | Slaby et al. |
| 10,061,458 B1 | 8/2018 | Bristol et al. |
| 10,065,114 B2 | 9/2018 | Goetgeluk et al. |
| 10,088,902 B2 | 10/2018 | Keller et al. |
| 10,126,779 B2 | 11/2018 | von Badinski et al. |
| 10,126,941 B2 | 11/2018 | Zhu et al. |
| 10,139,906 B1 * | 11/2018 | Bai ........................ G06F 3/017 |
| 10,146,308 B2 | 12/2018 | Cruz-Hernandez et al. |
| 10,183,217 B2 | 1/2019 | Chen et al. |
| 10,185,670 B2 | 1/2019 | Litichever et al. |
| 10,216,272 B2 | 2/2019 | Keller et al. |
| 10,331,777 B2 | 6/2019 | Hicks et al. |
| 10,346,038 B2 | 7/2019 | England et al. |
| 10,372,221 B2 | 8/2019 | Robert et al. |
| 10,372,270 B2 | 8/2019 | Hoggarth et al. |
| 10,386,960 B1 | 8/2019 | Smith |
| 10,416,774 B2 | 9/2019 | Weddle et al. |
| 10,437,337 B2 | 10/2019 | Park |
| 10,444,834 B2 | 10/2019 | Vescovi et al. |
| 10,490,035 B2 | 11/2019 | Morrell et al. |
| 10,496,193 B1 | 12/2019 | Alfano et al. |
| 10,496,235 B2 | 12/2019 | Woley et al. |
| 10,503,454 B2 | 12/2019 | Sirpal et al. |
| 10,509,469 B2 | 12/2019 | Erivantcev et al. |
| 10,514,780 B2 | 12/2019 | Su et al. |
| 10,514,831 B2 | 12/2019 | Sirpal et al. |
| 10,514,877 B2 | 12/2019 | Becze |
| 10,528,230 B2 | 1/2020 | Sirpal et al. |
| 10,528,312 B2 | 1/2020 | Reeves |
| 10,534,447 B2 | 1/2020 | Li |
| 10,540,052 B2 | 1/2020 | Gimpl et al. |
| 10,540,087 B2 | 1/2020 | Sirpal et al. |
| 10,545,580 B2 | 1/2020 | Yang et al. |
| 10,545,712 B2 | 1/2020 | Reeves et al. |
| 10,547,716 B2 | 1/2020 | Jeon et al. |
| 10,552,007 B2 | 2/2020 | Sirpal et al. |
| 10,558,321 B2 | 2/2020 | Sirpal et al. |
| 10,558,414 B2 | 2/2020 | Reeves et al. |
| 10,558,415 B2 | 2/2020 | de Paz |
| 10,572,095 B2 | 2/2020 | Sirpal et al. |
| 10,579,099 B2 | 3/2020 | Wang et al. |
| 10,592,061 B2 | 3/2020 | Sirpal et al. |
| 10,599,218 B2 | 3/2020 | Saboune et al. |
| 10,606,359 B2 | 3/2020 | Levesque et al. |
| 10,627,902 B2 | 4/2020 | Vescovi et al. |
| 10,652,383 B2 | 5/2020 | Selim |
| 10,664,121 B2 | 5/2020 | Sirpal et al. |
| 10,664,129 B2 | 5/2020 | Lee et al. |
| 10,678,411 B2 | 6/2020 | Reeves et al. |
| 10,684,478 B2 | 6/2020 | Osterhout |
| 10,698,486 B2 | 6/2020 | Reynolds et al. |
| 10,705,674 B2 | 7/2020 | Gimpl et al. |
| 10,706,251 B2 | 7/2020 | Shim et al. |
| 10,713,907 B2 | 7/2020 | Anderson et al. |
| 10,716,371 B2 | 7/2020 | Ward |
| 10,719,191 B2 | 7/2020 | Sirpal et al. |
| 10,719,232 B2 | 7/2020 | Tse |
| 10,740,058 B2 | 8/2020 | Sirpal et al. |
| 10,768,747 B2 | 9/2020 | Wang et al. |
| 10,775,891 B2 | 9/2020 | Sinclair et al. |
| 10,795,448 B2 | 10/2020 | Miller |
| 10,803,281 B2 | 10/2020 | Han et al. |
| 10,831,358 B2 | 11/2020 | Webber |
| 10,845,938 B2 | 11/2020 | Sirpal et al. |
| 10,849,519 B2 | 12/2020 | Mendenhall et al. |
| 10,852,154 B1 | 12/2020 | Knas et al. |
| 10,852,700 B2 | 12/2020 | Abramov |
| 10,853,013 B2 | 12/2020 | Sirpal et al. |
| 10,853,016 B2 | 12/2020 | Sirpal et al. |
| 10,871,871 B2 | 12/2020 | Cassar et al. |
| 10,893,833 B2 | 1/2021 | Harverinen et al. |
| 10,915,214 B2 | 2/2021 | Sirpal et al. |
| 10,922,870 B2 | 2/2021 | Vaganov |
| 10,942,615 B2 | 3/2021 | Helmes et al. |
| 10,949,051 B2 | 3/2021 | Sirpal et al. |
| 10,955,974 B2 | 3/2021 | Griffin |
| 10,963,007 B2 | 3/2021 | de Paz et al. |
| 10,964,178 B2 | 3/2021 | Aleksov et al. |
| 10,976,820 B2 | 4/2021 | Ganadas et al. |

(56) References Cited

U.S. PATENT DOCUMENTS

| | | | |
|---|---|---|---|
| 10,976,822 B2 | 4/2021 | Dogiamis et al. | |
| 10,983,559 B2 | 4/2021 | Reeves et al. | |
| 10,990,242 B2 | 4/2021 | Sirpal et al. | |
| 11,010,047 B2 | 5/2021 | Sirpal et al. | |
| 11,061,476 B2 | 7/2021 | Remaley et al. | |
| 11,073,826 B2 | 7/2021 | Cella et al. | |
| 11,093,200 B2 | 8/2021 | Reeves et al. | |
| 11,093,769 B2 | 8/2021 | Dow et al. | |
| 11,106,355 B2 | 8/2021 | Kolondra et al. | |
| 11,119,633 B2 | 9/2021 | Yamamoto | |
| 11,132,161 B2 | 9/2021 | de Paz | |
| 11,137,796 B2 | 10/2021 | Sirpal et al. | |
| 11,151,234 B2 | 10/2021 | Kontsevich et al. | |
| 11,182,046 B2 | 11/2021 | Sirpal et al. | |
| 11,221,646 B2 | 1/2022 | Sirpal et al. | |
| 11,221,647 B2 | 1/2022 | Sirpal et al. | |
| 11,221,649 B2 | 1/2022 | Sirpal et al. | |
| 11,226,710 B2 | 1/2022 | Sirpal et al. | |
| 11,231,786 B1 | 1/2022 | Elangovan | |
| 11,243,521 B2 | 2/2022 | Cella et al. | |
| 11,262,792 B2 | 3/2022 | de Paz et al. | |
| 2002/0024675 A1* | 2/2002 | Foxlin | G06F 3/0346 356/620 |
| 2011/0210931 A1 | 9/2011 | Shai | |
| 2012/0139708 A1* | 6/2012 | Paradiso | G06F 3/0346 340/10.1 |
| 2014/0139422 A1* | 5/2014 | Mistry | G06F 1/163 345/156 |
| 2016/0187974 A1* | 6/2016 | Mallinson | A63F 13/5255 463/32 |
| 2016/0196692 A1 | 7/2016 | Kjallstrom et al. | |
| 2017/0228921 A1* | 8/2017 | Buhlmann | G06T 19/006 |
| 2017/0239560 A1 | 8/2017 | Muratov | |
| 2018/0143697 A1 | 5/2018 | Kim et al. | |
| 2019/0011999 A1* | 1/2019 | Beach | G06F 3/0346 |

\* cited by examiner

INTERACTING WITH A VIRTUAL ENVIRONMENT USING A POINTING CONTROLLER

CROSS-REFERENCE TO RELATED APPLICATIONS

This application is the National Stage of International Application No. PCT/IB2019/054490, filed on May 30, 2019, which claims the benefit of U.S. Provisional Patent Application No. 62/678,987 filed on May 31, 2018, U.S. Provisional Patent Application No. 62/678,989 filed on May 31, 2018, U.S. Provisional Patent Application No. 62/737,088 filed on Sep. 26, 2018, and U.S. Provisional Patent Application No. 62/740,411 filed on Oct. 2, 2018, each of which are incorporated by reference herein.

BACKGROUND

Technical Field

This disclosure relates to controlling interactions with a virtually rendered environment, and more specifically, to controlling interactions using a pointing controller.

Description of the Related Art

In augmented reality and virtual reality environments, a display device presents digital content that may include virtual objects. Conventional controllers for interacting with virtual objects in these environments are often bulky and unnatural to use. As a result, the user's experience interacting with the virtual environments may be unsatisfactory.

SUMMARY

A method controls interactions with virtual objects using a pointing controller. Sensor data is obtained from an inertial measurement unit of the pointing controller. Movement of a pointing vector is tracked through a three-dimensional virtual space based on the inertial measurement unit and a stored arm model. An intersection of the pointing vector with coordinates occupied by a virtual object in the three-dimensional virtual space is detected to place the virtual object in a selected state. A first interaction with the pointing controller is detected while the virtual object is in the selected state. The virtual object is placed in a grabbed state in response to the first interaction. A position of the virtual object is caused to track the movement of the pointing controller while the virtual object is in the grabbed state. A second interaction with the virtual object is detected while the virtual object is in the grabbed state. The virtual object is placed in a free state in response to the second interaction. The virtual object is caused to stop tracking movement of the pointing vector in response to the second interaction.

In an embodiment, detecting the first intersection comprises generating a pointing cone having a central axis aligned with the pointing vector, an origin proximate to a location of the pointing controller, and a radius that increases with distance from the origin of the pointing vector. The intersection is detected with the pointing vector responsive to the pointing cone overlapping with coordinates occupied by the virtual object.

In an embodiment, the first interaction comprises a pinching gesture. The pinching gesture is detected in response to detecting a touch with an inter-digit button of the pointing controller on a first side of the ring controller.

In an embodiment, the second interaction comprises a release of the pinching gesture. The release of the pinching gesture is detected in response to detecting a release of the touch with the inter-digit button of the pointing controller.

In an embodiment, a swiping gesture on a slider control interface of the pointing controller is detected while the virtual object is in the grabbed state. The virtual object is caused to move along the pointing vector in a direction associated with the swiping gesture.

In an embodiment, tracking the movement of the pointing vector comprises detecting whether the pointing controller is indoors or outdoors, and adjusting parameters of the arm model depending on whether the pointing controller is indoors or outdoors.

In an embodiment, tracking the movement of the pointing vector comprises detecting whether a user of the pointing controller is sitting or standing, and adjusting parameters of the arm model depending on whether the user of the pointing controller is sitting or standing.

In an embodiment, tracking the movement of the pointing vector comprises detecting a fatigue level associated with a user of the pointing controller, and adjusting parameters of the arm model depending on the detected fatigue level.

In another embodiment, a non-transitory computer-readable storage medium stores instructions that when executed by a processor cause the processor to perform the above-described methods.

In another embodiment, a computing device comprises a processor and a non-transitory computer-readable storage medium storing instructions that when executed by a processor cause the processor to perform the above-described methods.

In another embodiment, a pointing controller comprises a ring structured to be worn on a first finger. The ring has a concave outer surface on a first side of the ring shaped to substantially conform to a second finger adjacent to the first finger. An inter-digit button is on the concave outer surface of the ring. The inter-digit button comprises a force sensor to detect squeezing of the ring between the first and second fingers. A slider interface is on a convex surface on a second side of the ring opposite the concave surface. The slider interface comprises a touch sensor to detect a touch to the slider interface by a third finger.

In an embodiment, the ring comprises a flat printed circuit board internal to the ring having an interior cutout, a riser printed circuit board internal to the ring substantially perpendicular to the flat printed circuit board, and a touch printed circuit board internal to the ring perpendicular to the flat printed circuit board and positioned interior to the convex surface of the second side of the ring. The touch printed circuit board comprises the touch sensor.

In an embodiment, a flexible cable is coupled to the touch printed circuit board. The flexible cable includes the force sensor positioned interior to the concave outer surface of the first side of the ring.

In an embodiment, the flat printed circuit board comprises a power sub-system, a haptic driver, a vibration motor, and an inertial measurement unit mounted thereon.

In an embodiment, the riser printed circuit board comprises a wireless interface, an output device, and an interconnect for the slider interface.

In another embodiment, an augmented reality system enables interaction with virtual objects. The augmented reality system comprises a display device that displays one or more virtual objects and a pointing controller that controls a pointing vector for interacting with the one or more virtual objects as described above.

In another embodiment, a pointing controller is structured to be held between a first and second finger. A chassis has a top plate and a bottom plate in substantially parallel planes. A first finger pad is between the top plate and the bottom plate. The first finger pad comprises a first concave surface on a first side of the pointing controller. The first finger pad is structured to partially encircle the first finger. A second finger pad is between the top plate and the bottom plate. The second finger pad comprises a second concave surface on a second side of the pointing controller opposite the first side. The second finger pad is structured to partially encircle the second finger. An inter-digit button is between the first finger pad and the second finger pad. The inter-digit button comprises a force sensor to detect squeezing of the pointing controller between the first and second fingers. A slider interface is integrated with the first parallel plate. The slider interface comprises a touch sensor to detect a location of a touch on the first parallel plate.

In an embodiment, a connecting member is centered along an axis substantially perpendicular to the parallel planes of the top plate and the bottom plate. The connecting member joins the top plate and the bottom plate by respective curved surfaces on opposite sides of the axis. The curved surfaces correspond to the first and second finger pads.

In an embodiment, an inertial measurement unit detects a change in position or orientation of the pointing controller.

In an embodiment, the first plate comprises a printed circuit board interior to the chassis and includes electronics of the pointing controller.

In an embodiment, the second plate comprises a battery and a haptic motor.

In another embodiment, an augmented reality system enables interaction with virtual objects. The augmented reality system comprises a display device that displays one or more virtual objects and a pointing controller that controls a pointing vector for interacting with the one or more virtual objects as described above.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

FIGS. 6A-E graphically illustrate examples of interactions with a virtual object using a pointing controller.

Figure 7:
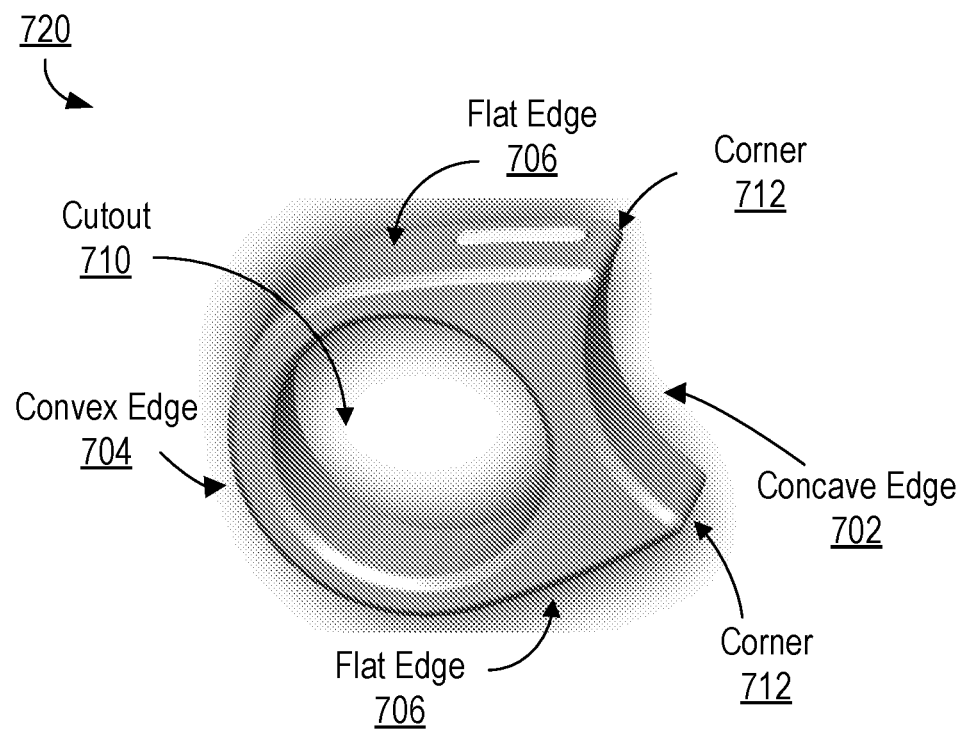

FIG. 7 illustrates an example embodiment of a pointing controller with a ring form factor.

Figure 8:
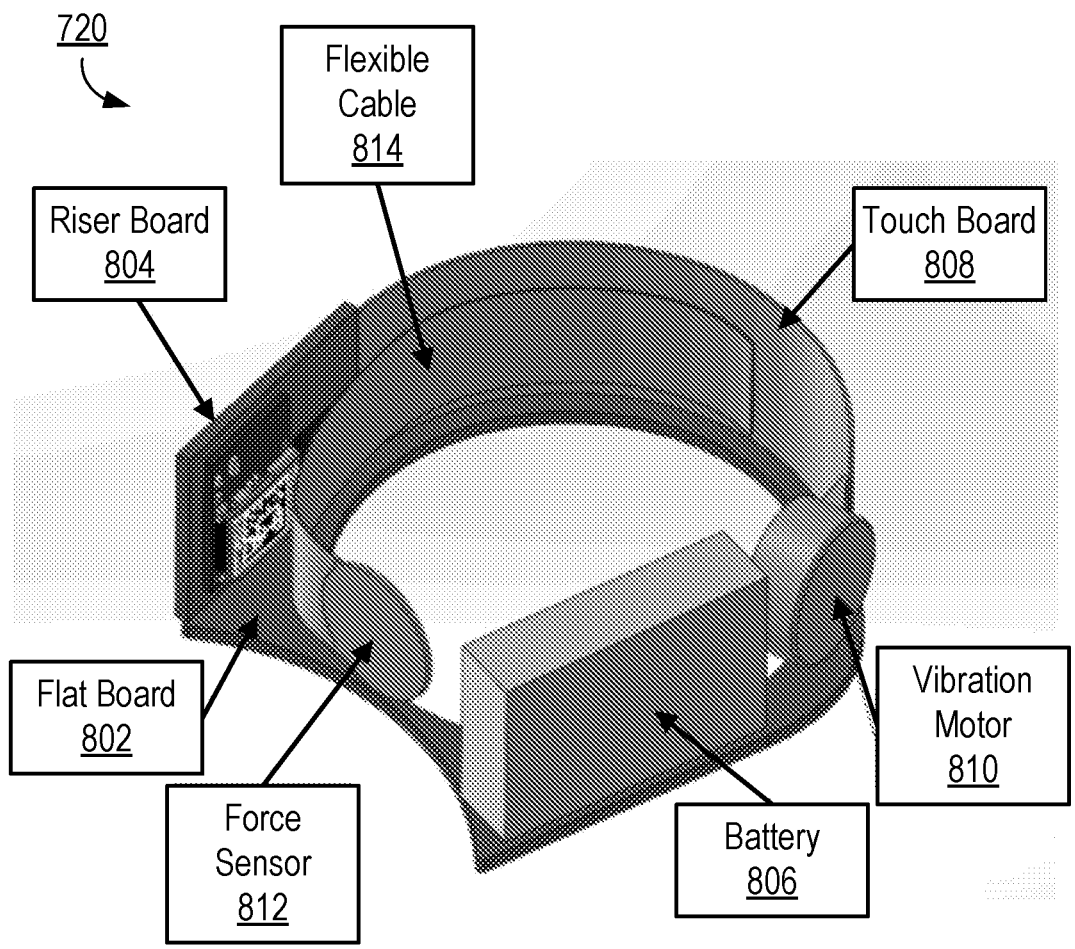

FIG. 8 illustrates an example embodiment of an internal layout of a pointing controller with a ring form factor.

Figure 9:
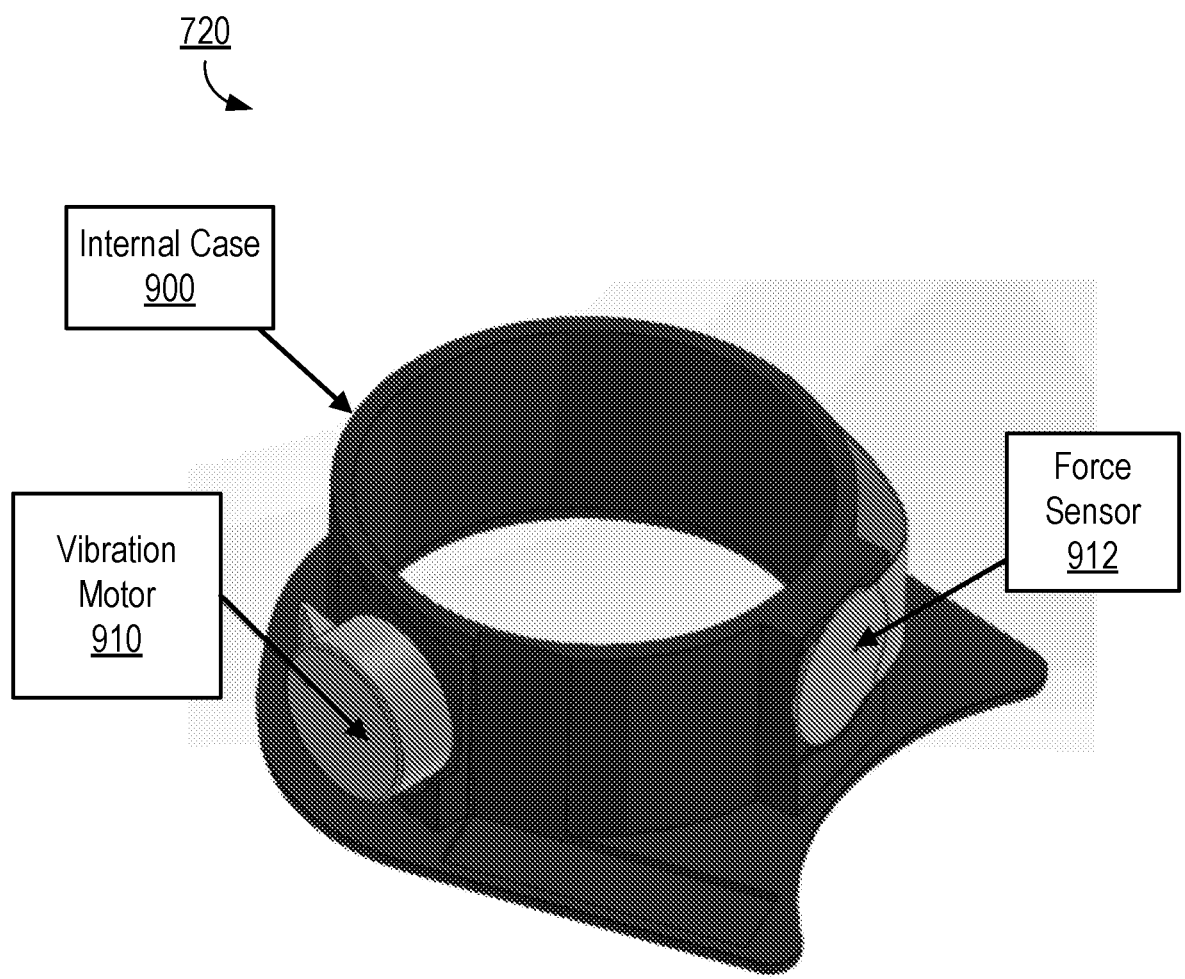

FIG. 9 illustrates an example embodiment of an internal housing for a pointing controller with a ring form factor.

Figure 10:
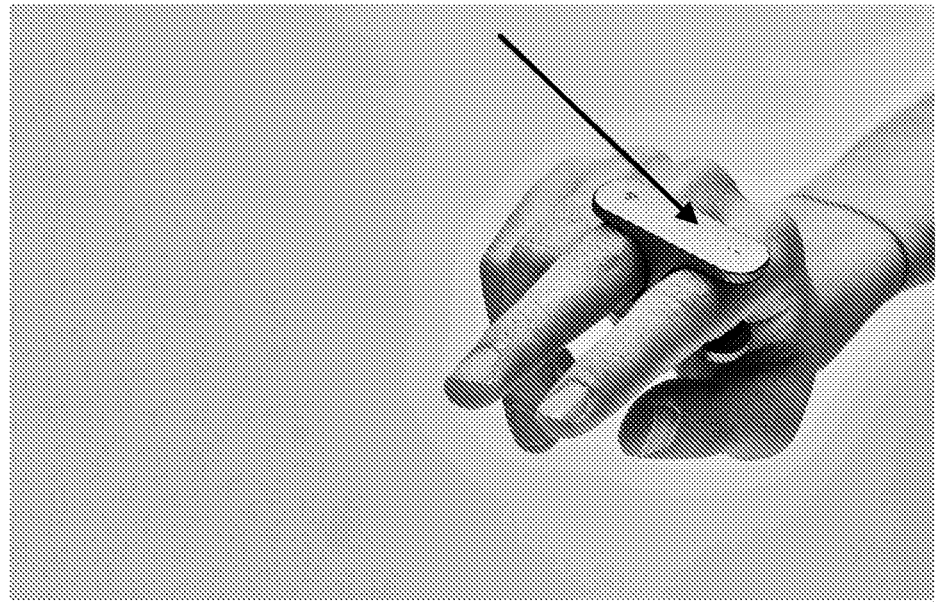

FIG. 10 illustrates an example use of a pointing controller with a form factor for grasping between adjacent fingers.

Figure 11:
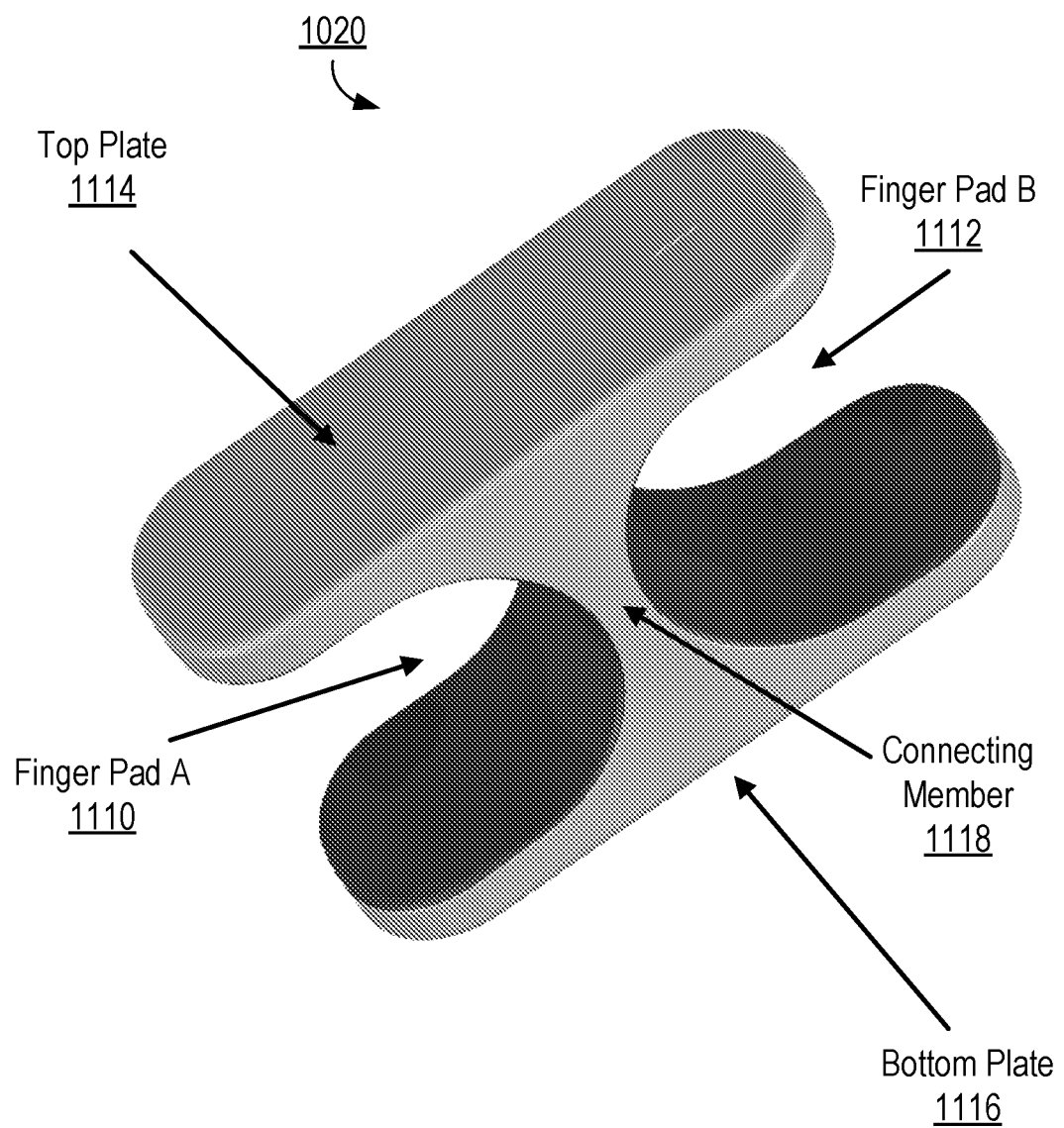

FIG. 11 illustrates an example structure of a pointing controller with a form factor for grasping between adjacent fingers.

Figure 12:
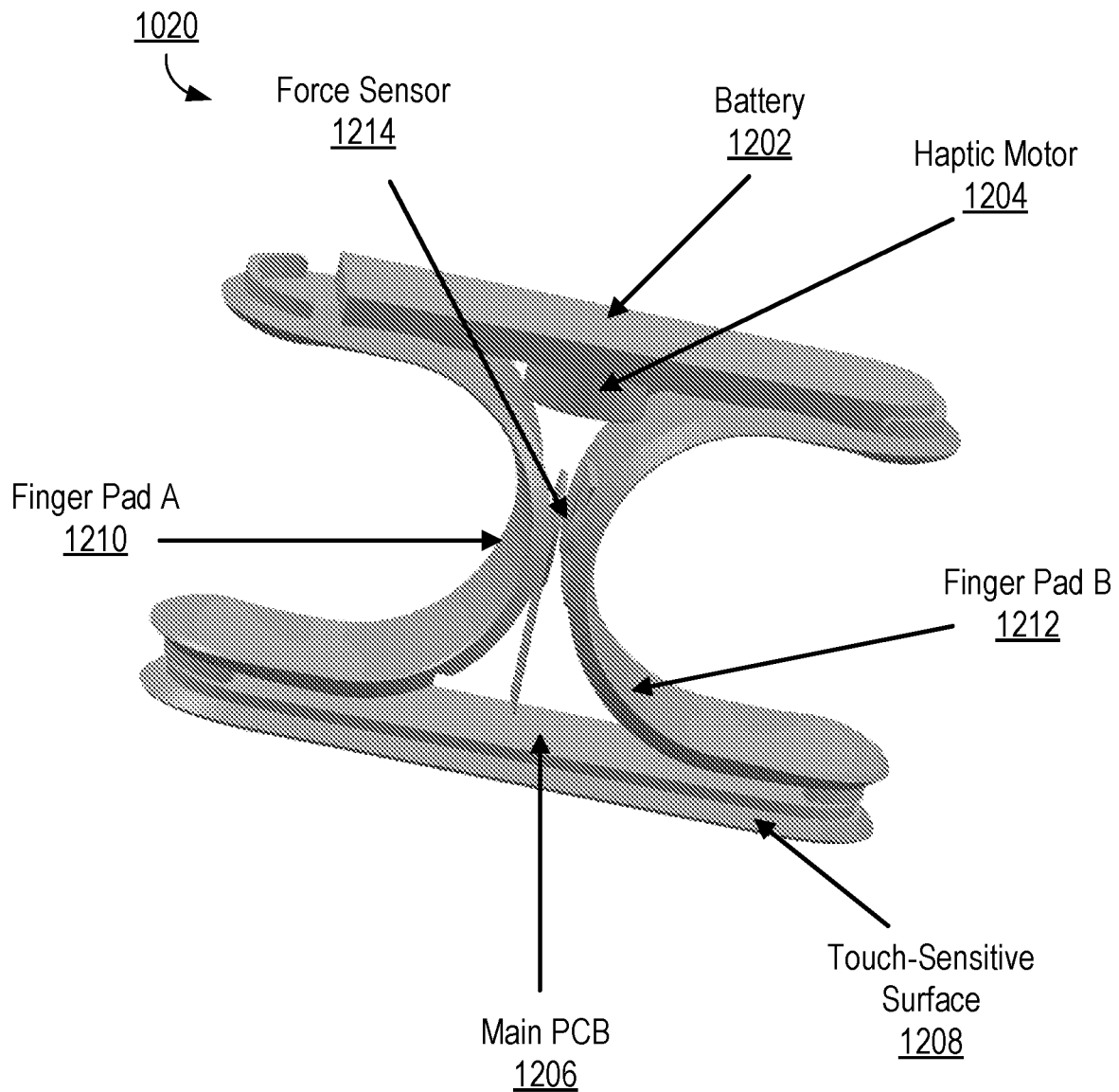

FIG. 12 illustrates an example embodiment of an internal layout for a pointing controller with a form factor for grasping between adjacent fingers.

Figure 13:

FIG. 13 illustrates an example embodiment of a docking station for a pointing controller.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
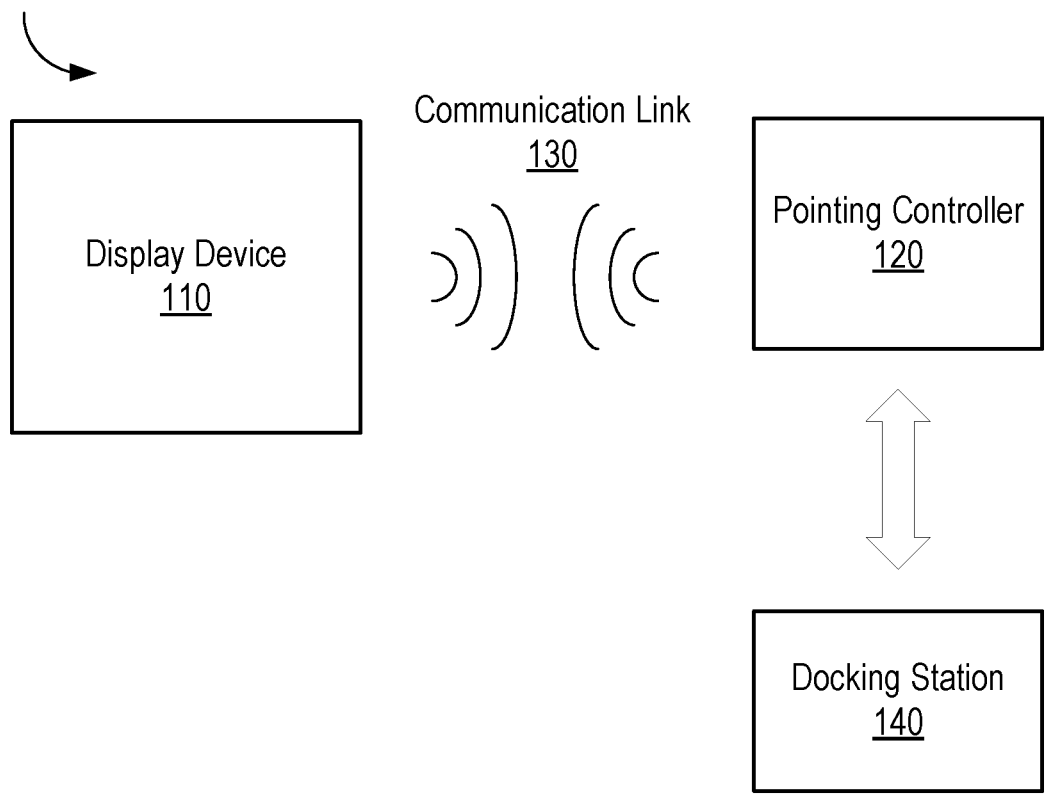
FIG. 1 illustrates an example embodiment of a digital display system.

FIG. 1 is a block diagram of a digital display system 100, according to one embodiment. The digital display system 100 includes a display device 110 and a pointing controller 120, and a docking station 140. The display device 110 and the pointing controller 120 may be connected via a communication link 130. In alternative configurations, different and/or additional components may be included in the digital display system 100.

The display device 110 comprises a computer device for processing and presenting digital content such as audio, images, video, or a combination thereof representative of a virtual environment in a three-dimensional space. The display device 110 may comprise a virtual reality display device, an augmented reality display device, or a mixed reality display device. The display device 110 may be embodied, for example, as a head-mounted apparatus having an integrated display or a removable display such as a smartphone or tablet. In alternative embodiments, the display device may comprise a generic display device such as a smartphone, tablet, or display screen that is not necessarily head-mounted. In an augmented reality application, the display device 110 enables presentation of information and/or virtual objects together with a viewer's view of the real world. This overlay may be implemented, for example, through a semi-transparent display that enables the user to view the rendered presentation concurrently with a real world view, a projection system that projects virtual objects or information onto the real world view, or a camera feed that captures the real world view, combines it with the overlaid presentation, and presents the combined view to the user via a display. In a virtual reality environment, the display device 110 presents a virtual scene that is completely rendered without combining aspects of the real world environment.

The display device 110 communicates with the pointing controller 120 via the communication link 130 and manages presentation of the digital content based on interactions received from the pointing controller 120. Furthermore, the display device 110 may communicate feedback signals to the pointing controller 120 related to the content presented on the display device 110 or in response to control signals from the pointing controller 120. An embodiment of a display device 110 is described in further detail below with respect to FIG. 3.

The pointing controller 120 comprises a control device for controlling the presentation of digital content on the display device 110. In an embodiment, the pointing controller 120 has a ring-shaped form factor to enable it to be worn on a finger such as the index finger, as illustrated in FIG. 7. Alternatively, the pointing controller 120 may have a form factor that enables it to be grasped between two adjacent fingers, as illustrated in FIG. 10. In other embodiments, the pointing controller 120 may comprise a band form factor enabling it to be worn on the hand or wrist. In another embodiment, the pointing controller 120 may comprise a knuckle duster that is worn across multiple fingers.

The pointing controller 120 includes various sensors and control interfaces to capture motion of the pointing controller 120 and to receive inputs from a user wearing the pointing controller 120. For example, the pointing controller 120 may capture human gestures such as pointing or waving and may capture interactions with control elements on the pointing controller 120. Beneficially, the pointing controller 120 enables a user to interact with the digital content in the virtual environment in a natural way. For example, a user may perform actions with objects in the three-dimensional space of the virtual environment such as pointing at virtual objects to select them, performing a pinching gesture to grab virtual objects, and moving virtual objects around in the virtual environment by motion of the hand. Additionally, the user may access and navigate a menu through simple gestures. The form factor of the pointing controller 120 provides a small and lightweight controller that is intuitive to use and does not detract from the experience interacting with the virtual environment. An embodiment of a pointing controller 120 is described in further detail below with respect to FIG. 2.

The communication link 130 comprises a wireless communication link to enable communication between the display device 110 and the pointing controller 120. For example, the communication link 130 may comprise a Bluetooth link, a Bluetooth Low Energy link, a WiFi link, or other wireless link. The communication link 130 may comprise a direct (e.g., peer-to-peer) communication channel between the pointing controller 120 and the display device 110 or may include an intermediate network (e.g., a local area network, a wide area network such as the Internet, or a combination thereof) that routes communications between the pointing controller 120 and the display device 110 through one or more intermediate devices (e.g., one or more network switches, routers, or hubs).

The docking station 140 couples with the pointing controller 120 to charge a battery of the pointing controller 120. In an embodiment, the docking station 140 is a portable device having a recess structured to mate with the shape of the pointing controller 120 in order to securely couple with the ring controller 120. The docking station 140 may be structured to protect the pointing controller 120 against dirt, liquids, shock or other environmental hazards when the pointing controller 120 is coupled with the docking station 140.

In various embodiments, the docking station 140 may securely couple with the pointing controller 120 using one or more securing mechanisms such as, for example, a friction fit mechanism in which the pointing controller 120 is secured against rigid or compressible walls (e.g., dense foam or rubber) of the docking station 140, clips made of a flexible material, a lid with hinge and catch (mechanical or magnetic), a lid that slides over the docked ring controller in a matchbox-style, permanent magnets within the docking station 140 and the pointing controller 120, small suction cups that make contact with a flat face of the pointing controller 120, tight walls that cause retention of the pointing controller 120 via a vacuum effect (possibly with a valve to release the vacuum to allow user to remove ring from dock easily), or a combination thereof.

The docking station 140 includes a battery and a wireless or wired charging circuit to transfer power to the battery of the pointing controller 120. The battery of the docking station 140 may be charged from a conventional power source using a cable such as a USB C cable. In an embodiment, the docking station 140 may include spring-loaded pins that couple with two or more contacts on the outer surface of the pointing controller 120 to provide a connection for providing power from the docking station pointing to the ring controller 120. The contact points may be part of a dedicated charging interface or could be incorporated in to the visual design of the pointing controller 120 in order to visually disguise their purpose. Alternatively, the docking station 140 may comprise an inductive transmit coil and associated circuitry that couples with an inductive receive coil within the pointing controller 120 to provide power to the pointing controller 120. In another embodiment, the docking station 140 may comprise capacitive parallel plates that couple with plates on the pointing controller 120 to provide power from the docking station 140 to the pointing controller 120 via capacitive power transfer.

Optionally, the docking station 140 may also provide an intermediate interface to enable a connection between the pointing controller 120 and a computer to enable tasks such as performing firmware upgrades or downloading diagnostic information.

Figure 2:
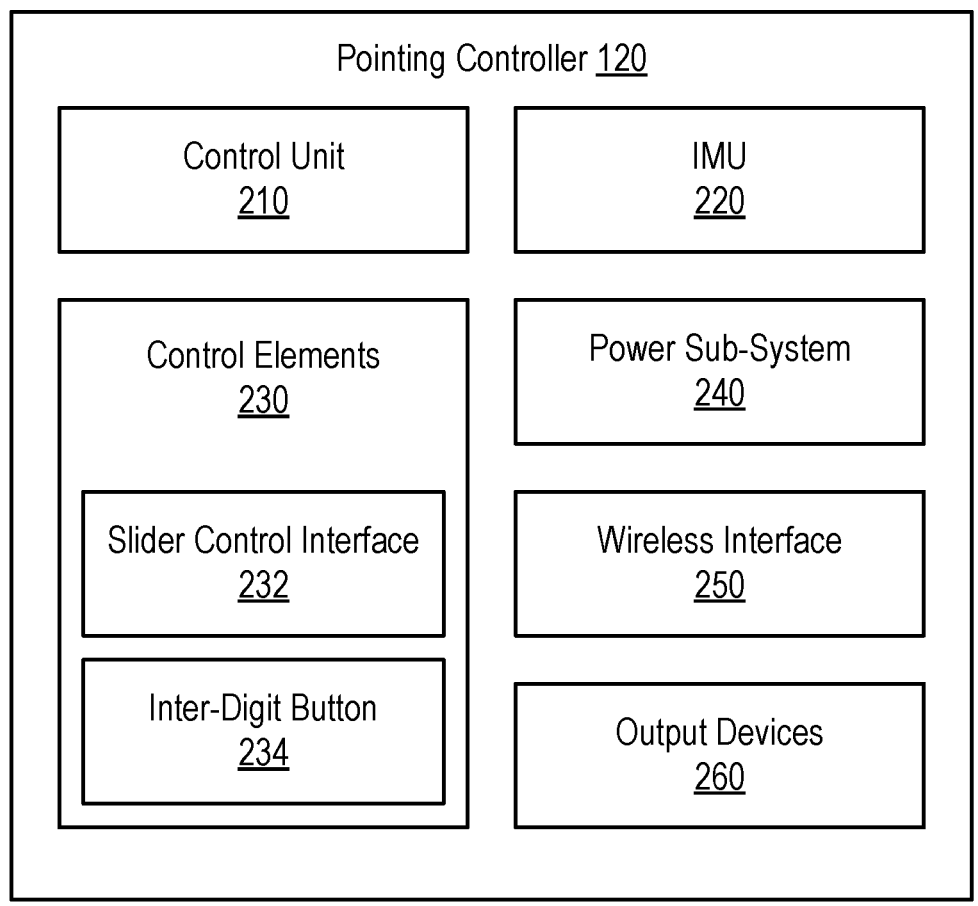
FIG. 2 illustrates an example embodiment of a pointing controller for the display device.

FIG. 2 is a block diagram illustrating an example embodiment of a pointing controller 120. In an embodiment, the pointing controller 120 comprises a control unit 210, an inertial measurement unit (IMU) 220, control elements 230, a power sub-system 240, a wireless interface 250, and output devices 260. In alternative embodiments, the pointing controller 120 comprises additional or different components.

The IMU 220 comprises an electronic device for sensing movement and orientation of the pointing controller 120. For example, the IMU 220 may comprise a six degree of freedom (6 DOF) sensor having a gyroscope for sensing orientation or angular velocity and an accelerometer for sensing acceleration. In another embodiment, the IMU 220 may comprise a nine degree of freedom (9 DOF) sensor that includes a gyroscope and accelerometer as described above and furthermore includes a magnetometer for detecting a magnetic field (e.g., the magnetic field of the earth). The magnetometer may be utilized as a compass to detect an orientation of the pointing controller 120 relative to the geographic cardinal directions. The IMU 220 may furthermore process data obtained by direct sensing to convert the measurements into other useful data, such as computing a velocity or position from acceleration data.

The control elements 230 include one or more controls for detecting control inputs from a user. The control elements 230 may include, for example, a touch sensor (e.g., a capacitive touch sensor), other sensors or transducers, or physical buttons, dials, switches, or other control mechanisms. In a particular embodiment, the control elements 230 include a slider control interface 232 and an inter-digit button 234. In other embodiments, different or additional control elements 230 may be employed.

The slider control interface 232 comprises a touch-sensitive pad accessible by a user's thumb or other finger. The touch-sensitive pad may comprise an array of sensing elements that detect changes in capacitance or resistance occurring in response to a touch, thereby enabling the touch-sensitive pad to detect the presence or absence of a touch and a location of touch within the area of the pad. In some embodiments, the touch-sensitive pad may additionally include touch force sensors to enable sensing of the force applied by the touch. A user may interact with the slider control interface 232 by performing various gestures such as tapping or swiping with the thumb or other finger that control functions of the pointing controller 120 or the display device 110 as will be described in further detail below. Swiping may be performed in a forward or backward direction along an axis of a finger (e.g., parallel to the pointing direction), along an axis substantially perpendicular to the axis of the finger (e.g., perpendicular to the pointing direction), or in a circular motion in a clockwise or counterclockwise direction. In the case of a pointing controller 120 having a ring form factor (e.g., the form factor of FIG. 7) and worn on an index finger, the slider control interface 232 may be positioned on a side of the pointing controller 120 adjacent to the thumb. Alternatively, in the form factor of FIG. 8, the slider controller interface 232 may be positioned on a bottom side of the pointing controller 120 on the surface running across the bottom of the index and middle fingers.

The inter-digit button 234 may comprise a touch-sensitive and/or pressure-sensitive pad positioned such that it can be selected by squeezing two fingers together. For example, in the ring form factor of FIG. 7, the inter-digit button 234 may be on a side of the ring between the index finger and middle finger when the ring is worn on the index finger. Alternatively, in the form factor of FIG. 8, the inter-digit button 234 may be on an interior of the curved surface such that it is adjacent to the side of the index finger or the middle finger when the pointing controller 120 is held between the index and middle fingers. In an embodiment, the inter-digit button 234 comprises a force-sensitive resistor that detects a force applied to the touch-sensitive pad. Alternatively, the inter-digit button 234 may operate similarly to the touch-sensitive pad of the slider controller interface 232 discussed above. Due to its placement, the inter-digit button may be used primarily to detect a "pinching gesture" in which the middle finger and the index finger (or other pair of adjacent fingers) are pressed towards each other with at least a threshold pressure applied to the touch-sensitive and/or pressure-sensitive pad of the inter-digit button. The pinching gesture or other gestures with the inter-digit button 234 may control various actions of the pointing controller 120 or the display device 110 as will be described in further detail below.

The power sub-system 240 stores and supplies power to the pointing controller 120. For example, the power sub-system 240 may comprise a battery, a charging circuit for charging the battery, one or more voltage regulators to control the voltage supplied to other components of the pointing controller 120. In an embodiment, the power sub-system 340 may control the pointing controller 120 to switch between different power modes (e.g., a full power mode, a low power mode, and a sleep mode) in order to utilize the battery efficiently.

The wireless interface 250 communicates wirelessly with the display device 110 via the communication link 130. In an embodiment, the wireless interface 250 may comprise for example, a Bluetooth interface, a Bluetooth low energy interface, a WiFi link, or other wireless interface. The wireless interface 250 may communicate directly with the display device 110 via a peer-to-peer connection or may communicate with the display device 110 via one or more intermediate devices over a local area network, a wide area network, or a combination thereof. In an embodiment, the wireless interface 250 may furthermore communicate with different devices other than the display device 110 such as, for example, a mobile device, a network server, an internet-of-things (IoT) device, or other computing device.

The output devices 260 include various devices for providing outputs from the pointing controller 120 in response to control signals from the display device 110 or directly in response to actions on the pointing controller 120. The output devices 260 may include, for example, a haptic feedback device (e.g., a linear resonant actuator or eccentric mass vibration motor), one or more light emitting diodes (LEDs), or an audio output device.

The control unit 210 processes inputs from the IMU 220, control elements 230, power sub-system 240, and wireless interface 250 to control the various functions of the pointing controller 120. In an embodiment, the control unit 210 comprises a processor and a non-transitory computer-readable storage medium that stores instructions that when executed by the processor causes the processor to carry out the functions attributed to the controller 210 described herein. Alternatively, or in addition, the control unit 210 may comprise digital logic embodied as an application specific integrated circuit (ASIC) or field-programmable gate array (FPGA).

The control unit 210 may process raw data from the IMU 220 and control elements 230 to detect motion events or interaction events and then send processed events to the display device 110 instead of the raw data, thereby reducing bandwidth over the communication link 130. For example, the control unit 210 may obtain raw accelerometer, gyroscope, and/or magnetometer data form the IMU 220 and apply a sensor fusion algorithm to determine a detected orientation (e.g., roll, pitch, and yaw values). Furthermore, the control unit 210 may process raw touch data (e.g., capacitive or restive sensing) and perform processing such as analog-to-digital conversion and filtering to generate touch detect events indicating detection of a touch and a position or force of the touch which are sent to the display device 110.

Alternatively, the control unit 210 may send only raw data from the IMU 220 and control elements 230 to the display device 110 and the above-described processing may instead be performed on the display device 110. In another embodiment, the control unit 210 may send both raw and processed event data to the display device 110. This may be useful to enable different developers access to the specific data useful for a particular application.

In an embodiment, the other components of the pointing controller 120 may be coupled with the control unit 210 via a data bus such as a serial peripheral interface (SPI) bus, a parallel bus, or an I2C bus. Furthermore, the components of the pointing controller 120 may generate interrupt signals detectable by the control unit to enable low latency responses to user inputs.

Figure 3:
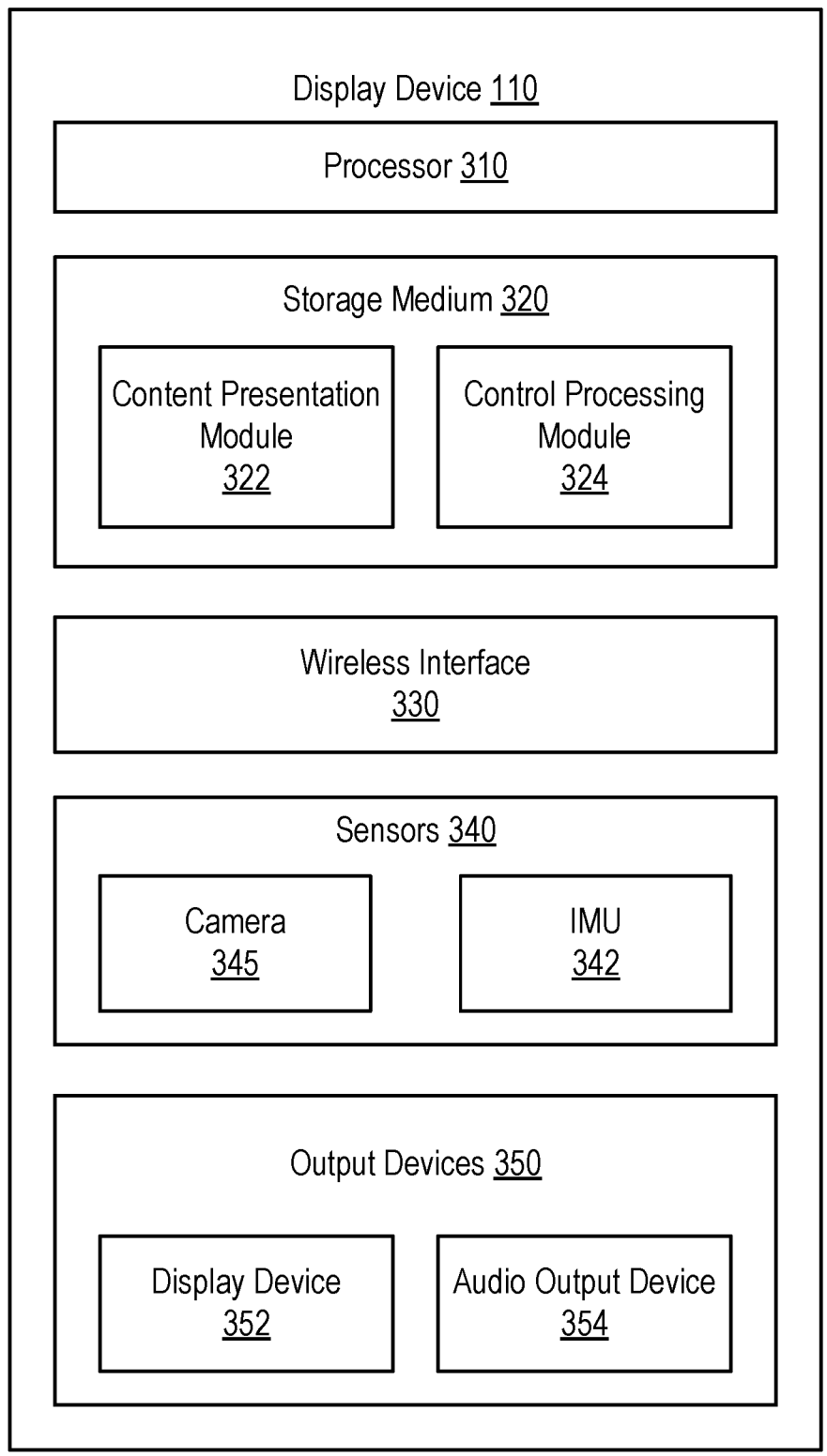
FIG. 3 illustrates an example embodiment of a display device.

FIG. 3 is a block diagram illustrating an embodiment of a display device 110. In the illustrated embodiment, the display device 110 comprises a processor 310, a storage medium 320, a wireless interface 330, sensors 340 including a camera 345, and output devices 350 including a display 352 and an audio output device 354. Alternative embodiments may include additional or different components.

The wireless interface 330 communicates wirelessly with the pointing controller 120 via the communication link 130. In an embodiment, the wireless interface 330 may comprise for example, a Bluetooth interface, a WiFi link, or other wireless interface. The wireless interface 330 may communicate directly with the pointing controller 120 via a peer-to-peer connection or may communicate with the pointing controller 120 via one or more intermediate devices over a local area network, a wide area network, or a combination thereof. In an embodiment, the wireless interface 330 may furthermore communicate with different devices other than the pointing controller 120 such as, for example, a mobile device, an IoT device, a network server, or other computing device.

In an embodiment, the wireless interface 330 may receive transmit information and commands to the pointing controller 120 to perform actions such as controlling the pointing controller 120 to enter various power modes; requesting detailed information about the status of the pointing controller 120 such as battery status, temperature, or other diagnostic information; updating the firmware of the pointing controller 120; activating a haptic actuator on the pointing controller 120 according to a specific vibration pattern; or configuring the haptic actuator on the pointing controller 120 to respond directly to events detected on the pointing controller 120, such as activating a particular button or control input on the pointing controller 120. The wireless interface 330 may furthermore periodically receive transmissions from the pointing controller 120 that include information such as IMU data from the IMU 220 of the pointing controller 120, control data from the control elements 230 of the pointing controller 120, or battery information from the power sub-system 240 of the pointing controller 120.

The sensors 340 detect various conditions associated with the operating environment of the display device 110. For example, a camera 345 captures real-time video of the real-world environment within the view of the display device 110, thus simulating the view seen by the user. Image data from the camera may be combined with virtual objects or information to present an augmented reality view of the world. The camera 345 may include a conventional image camera, a non-visual camera such as a depth camera or LIDAR camera, or a combination thereof.

The sensors 340 may also include an IMU 342 to sense movement and orientation of the display device 110. The IMU 342 may include similar components and may operate similarly to the IMU 220 of the pointing controller 120 discussed above.

The sensors 340 may optionally include other sensors for detecting various conditions such as, for example, a location sensor (e.g., a global positioning system) or a temperature sensor.

The output devices 350 include various devices for providing outputs from the display device 110 for presenting the digital content. In an embodiment, the output devices 350 may include at least a display 352 and an audio output device 354. In alternative embodiments, the output devices 350 may include additional output devices for providing feedback to the user such as, for example, a haptic feedback device and one or more light emitting diodes (LEDs). The audio output device 354 may include one or more integrated speakers or a port for connecting one or more external speakers to play audio associated with the presented digital content. The display device 352 comprises an electronic device for presenting images or video content such as an LED display panel, an LCD display panel, or other type of display. The display device 352 may be configured in a manner to present the digital content in an immersive way to present a simulation of a virtual or augmented reality environment. For example, the display device 352 may comprise a stereoscopic display that presents different images to the left eye and right eye to create the appearance of a three-dimensional environment. In an embodiment, the display device 352 may present digital content that combines rendered graphics depicting virtual objects and/or environments with content captured from a camera 345 to enable an augmented reality presentation with virtual objects overlaid on a real world scene.

The storage medium 320 (e.g., a non-transitory computer-readable storage medium) stores instructions executable by the processor 310 for carrying out functions attributed to the display device 110 described herein. In an embodiment, the storage medium 320 includes a content presentation module 322 and a control processing module 324. In alternative embodiments, the storage medium 320 may include additional or different modules.

The content presentation module 322 presents digital content via the display 352 and/or the audio output device 354. The displayed content may comprise a virtual reality or augmented reality environment in a three-dimensional space. The displayed content may include virtual objects which may be combined with real-world images captured by the camera 345. The content presentation module 322 may adapt its content based on information received from the control processing module 324.

The control processing module 324 processes inputs received from the pointing controller 120 via the wireless interface 330 and generates processed input data that may control the output of the content presentation module 322. For example, the control processing module 324 may track the position of the pointing controller 120 within the virtual environment displayed by the content presentation module 322 based on the received IMU data from the IMUs 220, 342. Furthermore, the control processing module 324 may process inputs from the control elements 230 to detect gestures performed with respect to the control elements 230. The control processing module 324 may determine actions to perform with respect to virtual objects within the three-dimensional environment based on the detected tracking of the pointing controller 120 and the detected gestures, and may cause the content presentation module 322 to update the presentation in response to the actions. An example of a control processing module 324 is described in further detail below.

Figure 4:
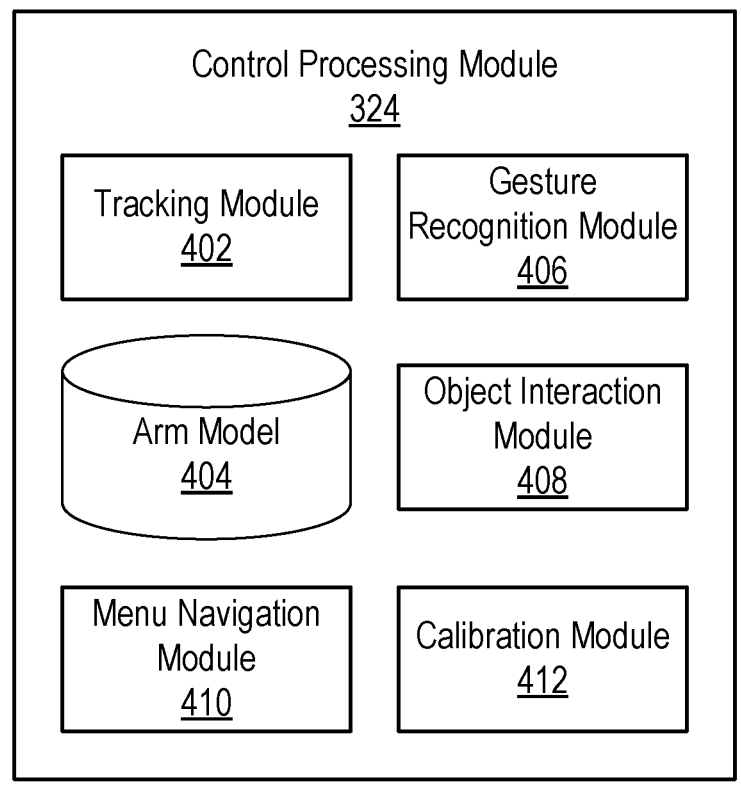
FIG. 4 illustrates an example embodiment of a control processing module for processing interactions from a pointing controller with the display device.

FIG. 4 illustrates an example embodiment of a control processing module 324. The control processing module 324 comprises a tracking module 402, an arm model 404, a gesture recognition module 406, an object interaction module 408, and a menu navigation module 410, and a calibration module 412. Alternative embodiments may include different or additional modules.

The tracking module 402 infers the position and orientation of the pointing controller 120 relative to the user's head. In an embodiment in which the display device 110 is integrated into a head-mounted display, the position of the player's head can be directly inferred from the position of the display device 110 because the display device 110 is fixed relative to the head position. Particularly, the tracking module 402 determines an orientation of the pointing controller 120 based on IMU data from the IMU 220 and obtains position and orientation for the display device 110 relative to the environment based on sensor data from the display device 110 (e.g., IMU data from the IMU 342 and/or location tracking data). The tracking module 402 then estimates the position of the pointing controller 120 relative to the environment based on the orientation of the pointing controller 120, the position and orientation of the display device 110, and an arm model 404 that models the pose of the user operating the pointing controller 120.

Based on the orientation and calculated position of the pointing controller 120, the tracking module 402 generates and continuously updates a pointing vector originating at the position of the pointing controller 120 and extending in a direction corresponding to the detected orientation. In the case of a pointing controller 120 worn on one or more finger, the pointing vector may extend along a central axis through the pointing controller 120 aligned with the fingers. The pointing vector may be specified according to coordinates in the virtual environment displayed by the display device 110. Thus, the pointing vector provides a pointing direction with respect to the scene in the virtual environment. The pointing vector may comprise, for example, a pair of angles including a first angle relative to a ground plane (i.e., a pitch angle) and a second angle relative to a vertical plane perpendicular to the ground plane (i.e. a yaw angle). In an embodiment, an orientation angle about the axis of the pointing vector (i.e., a roll angle) may also be tracked together with the pointing vector.

In an embodiment, the tracking module 402 may calculate a pointing cone around the pointing vector. Here, the cone originates at the pointing controller 120, has a central axis aligned with the pointing vector, and has a diameter that increases with distance from the pointing controller 120. The cone angle may be adjustable by the user, or developer, or may be a hardcoded parameter. Additionally, the cone angle may be automatically updated based on the context of a detected interaction with an object. For example, when interacting with an environment with a large number of objects close together, the cone angle may be automatically reduced relative to an environment with a small number of objects that are far apart. The tracking module 402 updates the pointing vector, the point cone, and the orientation angle as the user moves the pointing controller 120.

Parameters of the arm model 404 may be determined in an initialization process and may be updated during tracking as will be described below. Input parameters of the arm model 404 may include, for example, a height of the user, a standardized model of human proportions, a joint angle model, and various operating conditions that may change over time. The height of the user may be obtained manually from the user during the initialization process in response to a user prompt requesting the user to enter the height. Alternatively, the height may be automatically estimated based on an estimated position of the display device 110 relative to the ground. For example, a visual analysis may be performed on image data captured by the camera 345 of the display device 110 to estimate the height. Based on the user's height, the tracking module 402 may perform a lookup in a pre-populated lookup table that maps the height to the size of the hand, forearm, arm, shoulder, and neck based on the standardized model of human proportions. Then, using the combined dimensions of the human body model and the detected orientation of the pointing controller 120, the tracking module 402 can apply the joint angle model to predict relative probabilities of various arm poses. The most probable pose may be selected and the tracking module 402 may estimate the position of the pointing controller 120 relative to the display device 110 from the pose.

In an embodiment, additional information derived by the tracking module 402 can be incorporated to more accurately predict the user's pose and eliminate undesirable results. For example, if the most likely predicted pose generated by the joint angle model predicts the user's arm intersecting with a known location of a detected real-world object (an impossible result), the tracking module 402 may instead select the next most probably prediction which does not predict the arm intersecting with a detected object.

In another embodiment, the tracking module 402 may utilize information about the user's current location and/or movement history to improve the accuracy of the tracking by applying different parameters of the arm model 404 in different contexts. For example, because people tend to use more expansive gestures when outdoors than when indoors, the tracking module 402 may adjust the parameters of the arm model 404 depending on whether the user is indoors or outdoors. The tracking module 402 may detect whether the user is indoors or outdoors based on image analysis of captured images or other sensor data. In one technique, the tracking module 402 may determine whether the user is indoors or outdoors based on the presence or absence of a ceiling plane within a certain distance of the user (e.g., not more than 5 meters above the user), which may be detected based on image analysis from captured images or from other sensors. In another embodiment, the tracking module 402 may measure the number of planar surfaces within a specified distance of the display device 110 and determine that the user is indoors if the number exceeds a predefined threshold, and determine that the user is outdoors if the number does not exceed the threshold. In yet another embodiment, a location sensor (e.g., a global-positioning system device) may be used to determine the geographic location of the display device 110. Then, utilizing map data from a maps service, the tracking module 402 may determine that the user is indoors if the location coincides with a building or otherwise determine that the user is outdoors. In yet another embodiment, a wireless signal strength of a wireless signal received by the display device 110 from a remote source (e.g., a GPS signal or cellular data signal) may be used to determine whether the user is indoors or outdoors. For example, when the wireless signal strength is above a predefined threshold, the tracking module 402 determines that the user is outdoors and when the wireless signal strength is below the threshold, the tracking module 402 determines that the user is indoors. In yet another embodiment, the tracking module 402 may perform an analysis of the brightness and/or wavelengths of local light sources detected by the camera 345 to detect whether the user is indoors or outdoors. For example, high brightness lights around the color temperature of sunlight indicates that the user is likely to be outdoors, while color temperatures consistent with light bulbs are indicative of the user being indoors.

In another embodiment, the parameters of the arm model 404 may be adapted based on whether the user is sitting or standing. Here, the tracking module 402 may determine if the user is sitting or standing by detecting the height of the display device 110 relative to the ground as described above and detecting whether the height is significantly below the user's standing height (e.g., above a threshold difference).

In an embodiment, the tracking module 402 may furthermore estimate a fatigue level of the user to better predict a pointing direction. Here, the tracking module 402 may model a fatigue level by tracking an amount of time a user spends with their wrist about a certain threshold height with the level of fatigue increasing with time. Because a user may prefer to keep the arm lower as fatigue increases, the parameters of the arm model 404 may cause the tracking module 402 to adjust the detected pointing direction upward as the predicted fatigue level increases to compensate for the expected drop in arm level. In an embodiment, the tracking module 402 may apply a machine-learning approach to model the fatigue characteristics of a particular user.

In an embodiment, the tracking module 402 may utilize image data from the camera 345 to sense the position of the pointing controller 120, hand, forearm, or arm. The tracking module 402 may utilize the sensed position to re-calibrate the orientation and position of the pointing controller 120 relative to the display device 110 to account for accumulated drift in the IMU data as described in further detail below. Furthermore, the tracking module 402 may apply the sensed position from the image data to improve the accuracy of the arm model 404 by updating estimated parameters such as lengths of the arm or the predicted joint angles. The position of the arm may furthermore be estimated from integration of successive acceleration values from the accelerometer of the IMU 220.

In an embodiment, the tracking module 402 may furthermore utilize positional information about the objects to infer the position of the pointing controller 120. For example, if an object is close by, it may be inferred that the hand is in a relaxed position close to the body. On the other hand, if the object is far away, it may be inferred that the hand is in an outstretched position.

In cases where the display device 110 is not head-mounted (e.g., the display device 110 is embodied as a handheld smart phone or tablet), the position of the user's head may be unknown relative to the tracked position of the display device 110. In this case, a calibration technique may be applied to estimate the position of the user's head relative to position of the display device 110. For example, in one embodiment, a user interface on the display device 110 prompts the user to touch the display device 110 to the user's nose during a calibration phase of an application. Alternatively, a camera of the display device 110 may capture images of the user's face and a face tracking algorithm may be applied to detect a central point of the face as corresponding to the initial head position. In yet another embodiment, the vertical component of the head position can be obtained manually by prompting the user to enter his or her height, or the user's height may be obtained from a linked health-tracking application or online service accessible by the display device 110.

Once calibrated, the tracking module 402 estimates the vertical component of the head position to be fixed in the three-dimensional space and vertical motion of the display device 110 may be tracked in the three-dimensional space relative to this position. Alternatively, a camera 345 of the display device 110 may capture images that are processed to detect changes in terrain height. The user's estimated head position may be updated based on the detected changes in terrain height to be at an approximately fixed vertical position above the ground.

In the horizontal plane, the tracking module 402 may estimate the head position to be a fixed horizontal offset from the tracked position of the display device 110. Thus, as the display device 110 moves and rotates in the horizontal plane, the head position is estimated at a fixed horizontal distance from the tracked position of the display device 110.

A re-calibration may be performed if the user changes from a sitting position to a standing position or vice versa. This change may be indicated manually by the user or may be automatically detected when an appropriate shift in the vertical position of the display device 110 (and/or the pointing controller 120) is detected. For example, a camera 345 of the display device 110 may capture images that may be processed to detect the height of the display device 110 relative to the ground and may be used to detect when the user sits down or stands up.

In an alternative embodiment, the user's head position may be assumed to be completely fixed. Here, instead of estimating the head position in the horizontal plane to track the horizontal motion of the display device 110 at a fixed offset, the head position may instead be estimated to stay at both a fixed vertical and horizontal position in the three-dimensional space without tracking the motion of the display device 110.

In yet another embodiment, a hybrid model may be used that combines the above-described techniques. Here, the initial head location relative to the display device 110 is first calibrated using the calibration technique described above (e.g., by prompting the user to touch the display device to the user's nose). The tracking module 402 may initially be set to a "stationary" mode in which it estimates the head position to be maintained at a fixed position in three-dimensional space. Position of the display device 110 is tracked using the IMU 342 as it moves through the three-dimensional space and a distance between the display device 110 and the fixed estimated head position is computed. When the distance between the estimated head location and the display device 110 exceeds a predefined activation radius (e.g., approximately equal to an estimated length of the user's fully extended arm), the tracking module 402 switches to a "walking" mode. In the "walking" mode, the head position is instead estimated to be a fixed distance behind the detected position of the display device 110. When the display device 110 detects that its motion drops below a threshold speed and remains below the threshold speed for a threshold time period, the tracking module 402 switches back to the "stationary mode" in which the estimated position of the head becomes fixed and is no longer updated based on the position of the display device 110.

Alternatively, when in the "walking mode," the head position relative to the display device 110 may instead be estimated using a mass-spring or mass-spring-damper model. In this embodiment, the estimated distance of the head behind the detected position of the display device 110 may vary over time but stabilizes to a fixed position when the display device 110 is stable for an extended time period. When the display device 110 detects that the distance between the smartphone and the head drops below a deactivation radius in this embodiment, the tracking module 402 switches back to the "stationary" mode.

The gesture recognition module 406 detects gestures made by the user with the pointing controller 120. Examples of gestures may include, for example, moving the pointing controller 120 in a predefined motion or interacting with the slider control interface 232 and/or the inter-digit button in a particular manner (e.g., single tapping, double tapping, maintaining prolonged contact, or a combination of interactions in a particular pattern). Here, the pinching gesture may be detected when the users squeezes the middle finger and index finger together (or other fingers in contract with the pointing controller 120), thereby causing one or more fingers to be placed in contact with the inter-digit button 234 on the pointing controller 120 with at least a threshold amount of pressure for at least a threshold time period. The pinching gesture may be released by separating the fingers or relieving the applied pressure. In some embodiments, the gesture recognition module 406 may capture a force or a time period of the pinching gesture and may take different actions depending on these captured parameters. The swiping gesture may be detected when the user performs a swiping motion on the slider controller interface 232. This gesture may typically be performed with the thumb (or other finger) on the hand wearing the pointing controller 120 but could alternatively be performed by a finger on the opposite hand. Here, the swiping gesture may comprise a linear swiping gesture along a line parallel to the one or more fingers holding the pointing controller 120 in either direction or along a line approximately perpendicular to the one or more fingers in either direction. Alternatively, the swiping gesture may comprise a radial swiping gesture performed in a clockwise or counterclockwise direction about a reference point in a plane of the slider controller interface 232. In some embodiments, the gesture recognition module 408 may capture a force, a velocity, or a distance of the swiping gesture and take different actions depending on these captured parameters. Other types of gestures may be also be recognized to perform various tasks.

The object interaction module 408 determines when the pointing vector or cone intersect an object in the scene being displayed on the display device 110. For example, the object interaction module 408 stores coordinates representing the locations occupied by objects in the scene and detects when the pointing vector or cone intersects coordinates occupied by one of the objects. The object interaction module 408 may update a state associated with the object from a "free" state to a "selected" state in response to detecting the intersection. If the tracked pointing vector or cone is moved such that it no longer intersects the coordinates occupied by the object, the object is de-selected and transitions back to the "free" state.

In the case that the pointing vector or cone intersects multiple objects, the object interaction module 406 may default to selecting the object closest to the pointing controller 120. In another embodiment, the tracking module 402 may intelligently predict whether the user is intending to point to a near object (e.g., less than 5 meters away) or a far object (e.g., greater than 5 meters away) when the pointing vector intersects multiple objects. For example, the tracking module 402 may infer that the user is intending to point to a far object when the arm is detected to be substantially aligned with the user's eyes and the arm is fully extended. The tracking module 402 may infer that the user is intending to point to a close object when the arm is bent and held at a position below eye level. Additionally, the display device 110 may calculate the average depth of the scene in the approximate direction where the user is facing and the average distances to virtual objects located in the approximate direction to better predict whether the user is intending to point to a near or far object.

In an embodiment, a visual indicator (e.g., a visual out glow or halo effect, a shaded outline, a bounding box, or similar) is displayed in association with an object when it is in the selected state. Optionally, detailed information about the selected object may also be displayed such as, for example, an object identifier, distance from the pointing controller 120 to the selected object, a status of the object, etc. Furthermore, when an object is selected or de-selected, the object interaction module 406 may cause a haptic motor of the pointing controller 120 to vibrate to provide physical feedback of the action. The intensity, duration, or frequency of this vibration may provide additional information about the object such as its weight (if known), its distance from the pointing controller 120, or whether it has any special interactions available.

Upon detection of a pinching gesture when a virtual object is in a selected state (i.e., the user is pointing at the virtual object), the state of the selected object may be transitioned from a selected state to a "grabbed" state. When in the grabbed state, the object interaction module 408 updates the position of the virtual object to track movement of the pointing vector such that a user can move the object around the scene. Furthermore, the object interaction module 408 can rotate a grabbed object about the pointing vector in response to rotation of the pointing controller 120 or in response to a swiping gesture. The object interaction module 408 can also cause a grabbed object to be moved towards or away from the pointing controller 120 along the pointing vector in response to the gesture recognition module 406 detecting a swiping gesture in a forward or backward direction. The object interaction module 408 may employ a motion model that determines how the grabbed object responds to a swiping gesture of different length, velocity, or force. For example, in one configuration, a swiping gesture moves the position of the virtual object forwards or backwards along the pointing vector in the direction of the swiping gesture. The swipe distance of the swiping gesture may control how far the object moves according to a linear or non-linear function, thus enabling precise small movements as well as large movements. In another configuration, the object interaction module 408 may set the velocity or momentum of a grabbed object according to the detected velocity of a swiping gesture based on a linear or non-linear function. In this case, the object may continue moving after the swiping gesture is completed with the velocity decaying over time until the object comes to rest, thus simulating "flinging" the object. The object interaction module 408 may calculate the velocity of the object after the swiping gesture from a physics model having parameters defining the object weight, friction, non-linear damping effects, etc. Different objects may have different parameters. For example, larger objects may be "heavier," thereby taking more effort to move. Upon release of the grabbing gesture, or upon an alternative "drop" gesture, the object interaction module 408 may release the virtual object at its new location and return the virtual object to a free state in which its position is no longer updated based on the tracked pointing vector.

The menu navigation module 410 generates a menu presented on the display device 352 in response to an object being selected or another action or combination of actions such as, for example, the slider control interface being tapped while the object is selected. The menu may allow a user to view and/or modify various object-specific attributes such as a brightness or color of an object, a transparency of an object, a weight of an object, or other attribute. In an embodiment, a wheel or slider interface may be displayed to allow a user to quickly modify parameters using a swiping gesture.

In an embodiment, the menu navigation module 410 may also generate a menu when no object is selected in response to detecting a menu gesture (e.g., a tap of the slider control interface). The menu may enable the user to select actions such as creating a new object from a range of options. The menu may provide a hierarchical selection process (e.g., first enabling selection of a category of objects and then enabling selection of a specific object within the category). The created object may then be placed into a grabbed state using the gestures described above and placed in the scene as desired.

In an embodiment, the menu may be presented as a radial interface appearing around the hand of the user wearing the pointing controller 120. Alternatively, the menu interface may be presented in front of the user or near a selected object. In an embodiment, selecting an item on the menu may trigger haptic feedback on the pointing controller 120. The menu navigation module 410 may detect selection of options in the radial menu by, for example, detecting that the pointing vector or cone intersects coordinates of the desired option, and then performing a predefined selection gesture (e.g., tapping the slider control interface). Alternatively, selected items in the menu may be changed by performing a swiping gesture to rotate the menu, thereby changing the selected option. In an embodiment, the menu may "snap" to the closest menu option following the swiping gesture. The presently selected option may be visually indicated by highlighting the option in the visual presentation. Another predefined gesture (e.g., pointing downwards or away from the menu) enables the user to navigate backwards in the menu hierarchy or to dismiss the presentation of the menu. Alternatively or in addition, a "back" or "up" menu option may enable navigation backwards in the menu hierarchy.

The calibration module 412 performs a calibration process to calibrate the pointing controller 120 in order to initialize the relative position and orientation of the pointing controller 120 to a position and orientation in the virtual environment presented by the content presentation module 362. The roll and pitch of the pointing controller 120 can be detected from the IMU 220 with the detected direction of gravity (as sensed by the IMU 220) mapped to a downward direction along the vertical axis of the virtual environment. The horizontal direction (yaw) of the pointing controller 120 can be sensed relative to a reference direction during calibration using a variety of techniques. This reference direction may be aligned with the forward looking direction of the display device 110 during the calibration process.

In one embodiment, a magnetometer in the IMU 220 of the pointing controller 120 may operate as a compass to detect magnetic North. A magnetometer in the display device 110 may similarly detect magnetic North and the calibration module 412 may perform a calibration to align these reference directions.

In another embodiment, a location and orientation of the pointing controller 120 can be detected based on an image (visual or depth) analysis performed on one or more images captured by a camera of the display device 110. The calibration module 412 may then perform a calibration using the detected IMU data and the determined location and position from the image data.

In another embodiment, the calibration module 412 performs the calibration by directing a user to point directly ahead and then perform a specific gesture (e.g., a double tap on the slider control interface 232 while also pressing the inter-digit button 234). Unintentional actions may be rejected by ignoring this gesture when the pointing controller 120 is not approximately horizontal, as detected by the IMU 220, when the gesture is detected. The calibration module 412 may then set the direction as a reference direction mapped to the straight ahead direction in the virtual environment.

In another embodiment, the calibration may be performed by directing the user to point to a small number of real world objects at locations that are known or can be detected from images captured by the image processing device. Here, in order to determine when a user is pointing at a target, the pitch of the pointing controller 120 should approximately match the pitch vector to the target and additionally the pointing controller 120 should be held approximately still. The calibration module 412 may then perform a calibration using the known positions of these objects in the virtual environment. In an embodiment, this calibration stage could be performed as part of a user tutorial to train the user how to use the pointing controller 120 to interact with objects.

In one particular embodiment, the display device 110 is configured to display a target object located far away (to minimize perspective error), and a prompt is displayed to direct the user to point at the target object. The calibration module 412 detects when the pointing controller 120 is approximately stationary (e.g., by detecting that the angular rotation rate is below a pre-determined threshold value), and determines that the current pointing direction to be the direction of the target object. In an embodiment, the display device 110 may provide a visual indicator to guide the user through the calibration. For example, after the display device 110 may display a visual indicator that starts to "fill up" (e.g., a progress bar animation, change in size of the visual indicator, etc.) when the pointing controller 120 has been stationary for a short period of time, and additionally the pitch of the pointing controller 120 approximately matches the pitch of the target relative to the user. During this time, the calibration module 412 records the detected orientation of the pointing controller 120 and determines the difference in yaw (heading) of the pointing controller 120 relative to the yaw of the display device 110. If the user moves the pointing controller 120 during the calibration period or the pitch falls outside of an accepted range, the progress is reset. Once the calibration process is complete, the target object may be dismissed from the display and the calibration value is stored. The above-described calibration process can be repeated multiple times with target objects at different yaws (headings) and/or pitches, to improve the accuracy. The calibration process can additionally be performed with target objects at different depths, or by instructing the user to remain facing in one direction but placing targets at the periphery of their vision, to improve the calibration.

In another embodiment, the display device 110 may display an outline of an image of the pointing controller 120 and direct the user to place the display device 110 on a flat horizontal surface, and then place the pointing controller 120 on the display screen of the display device 110 aligned with the outline of the image. The calibration module 412 detects when the pitch of the pointing controller 120 is below a threshold angle and when both the display device 110 and the pointing controller 120 are held still for a threshold time period. When these conditions are detected, the calibration module 412 stores the difference between the detected yaw of the pointing controller 120 and the display device 110 as a calibration offset. In operation, this calibration offset is subtracted from yaw measurements of the pointing controller 120.

Once calibrated, the calibration module 412 may enable the user to verify the calibration by displaying a test target and enabling the user to ensure that calibration has been performed correctly. In another embodiment, the calibration module 412 may perform continuous auto-calibration during use. The calibration module 412 may store a set of focal points associated with different types of objects. Here, the focal point of an object represents a point on an object of a given object type that a user is likely to have a preference for pointing at when the user attempts to point at that object type. For simple shapes, the focal point may be calculated by computing the center of mass of the object assuming uniform density. For complex shapes, the focal point may be calculated by computing to the center of mass of the convex hull that "wraps" the shape. For other types of functional objects, the focal point may be manually assigned based on the object type or may be learned for different types of objects using an external tracking system. For these types of objects, the focal point may be biased towards the point of interaction. For example, for a computer monitor, the focal point may correspond to a center of the screen, neglecting the stand. For a bicycle, the focal point may be biased from the center mass towards a point closer to the handlebars. For a piano, the focal point may be biased from the center of mass towards a point closer to the keys. For a door, the focal point may be biased from the center of mass towards a point closer to the handle/push plate.

In an embodiment, the focal point of an object may change with distance. For example, from a far distance, people will be likely to point at the center of the object, regardless of the object's purpose. Thus, in an embodiment, the center of mass of an object may be used as the focal point when the object is greater than a predefined distance away. However, when closer to the object, people may tend towards the point of interaction on functional objects, but continue to point at the center of mass for simpler objects. Thus, in an embodiment, a pre-assigned focal point based on the object type may be used when the object is closer than the predefined distance. Each time an object is selected, the calibration module 412 may determine the difference between the direction of the focal point of the object and the actual pointing direction of the pointing controller 120 at the instant the object is selected. If these differences (and in particular, the yaw component) are consistently biased in one direction, the calibration module 412 may detect a miscalibration. In an embodiment, the miscalibration is only detected once a sufficient confidence level is reached such as, for example, after the yaw component of a number of object selections have been consistently biased in one direction. Upon detecting a miscalibration, the calibration module 412 can adjust the calibration parameter to correct the miscalibration. This re-calibration may be performed instantaneously or gradually applied over several seconds (to prevent the user seeing any "jumps").

Figure 5:
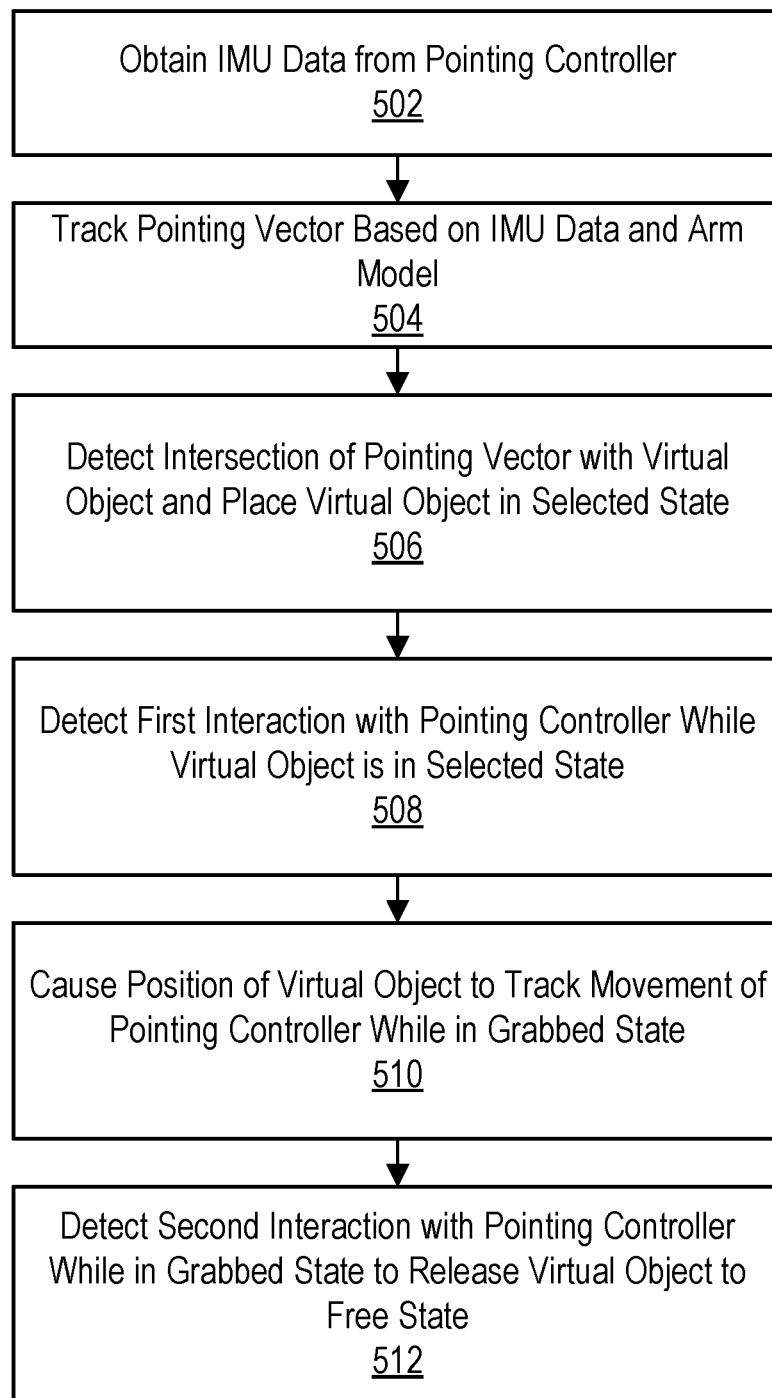
FIG. 5 illustrates an example embodiment of a process for controlling a user interface in a virtual environment based on actions detected on a pointing controller.

FIG. 5 is a flowchart illustrating an example embodiment of a process for interacting with virtual objects displayed by a display device 110 using a pointing controller 120. A controller processing module 324 obtains 502 IMU data from the pointing controller 120. The controller processing module 324 tracks 504 a pointing vector based on the IMU data and a stored arm model. The controller processing module 324 detects 506 an intersection of the pointing vector with coordinates occupied by a virtual object and places the virtual object in a selected state. When in the selected state, the controller processing module 324 detects 508 a first interaction (e.g., a pinching gesture) with the pointing controller 120 and places the virtual object in a grabbed state. The controller processing module 324 causes 510 a position of the virtual object to track movement of the pointing controller 120, based on the IMU data, while the virtual object is in the grabbed state. In response to detecting 512 a second interaction with the pointing controller 120 (e.g., releasing the pinching gesture), the controller processing module 324 causes the virtual object to be placed into a free state such that its location no longer updates with movement of the pointing controller 120. Thus, the described process enables interactions with virtual objects in a manner that it is intuitive and simple to learn.

Figure 6A:
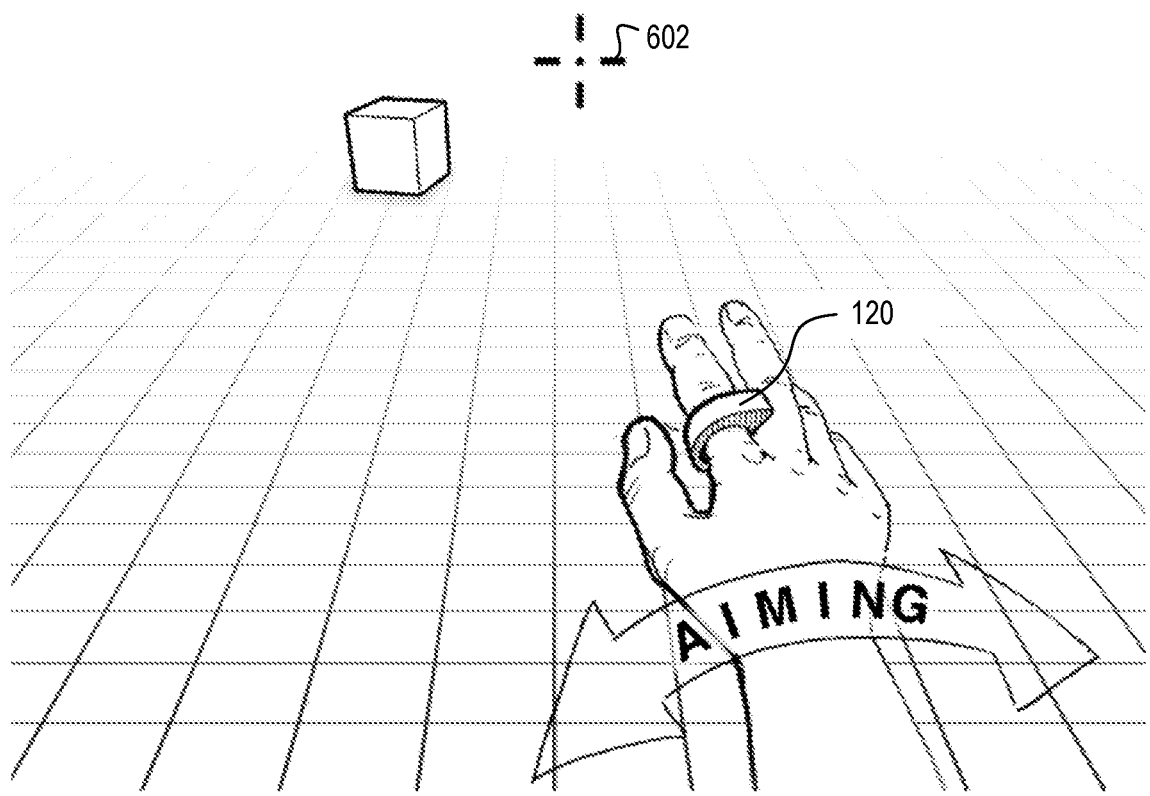
Figure 6B:
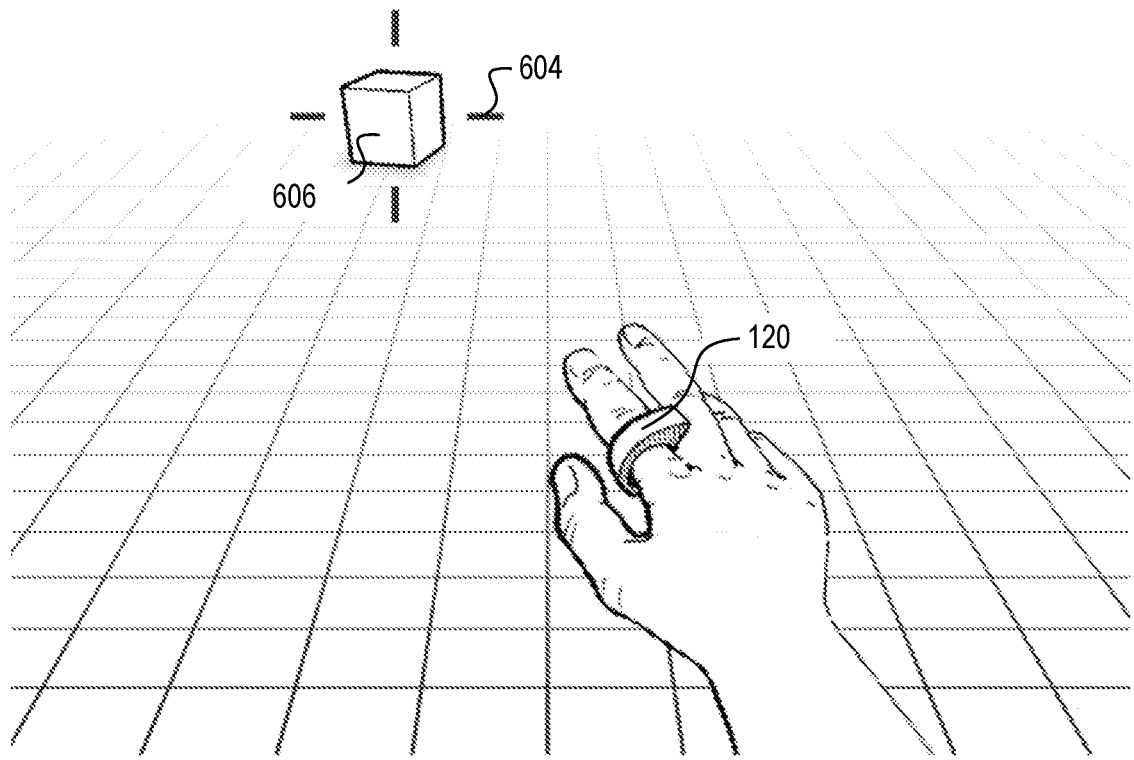
Figure 6C:
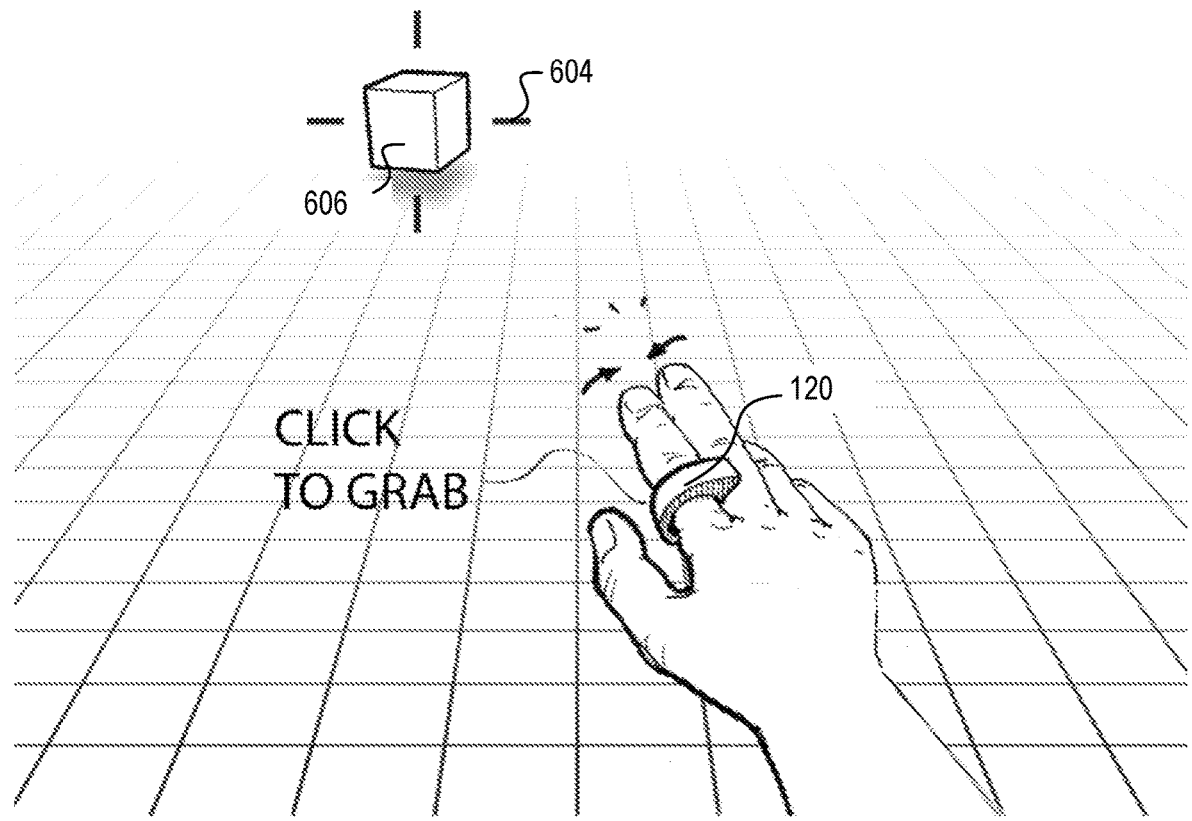
Figure 6D:
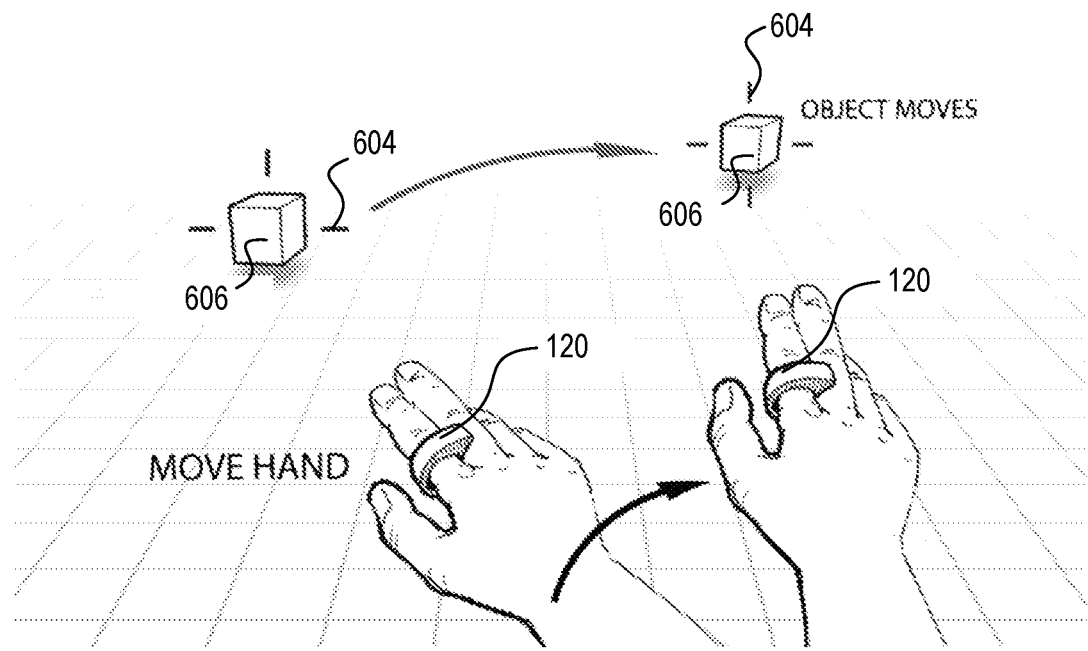
Figure 6E:
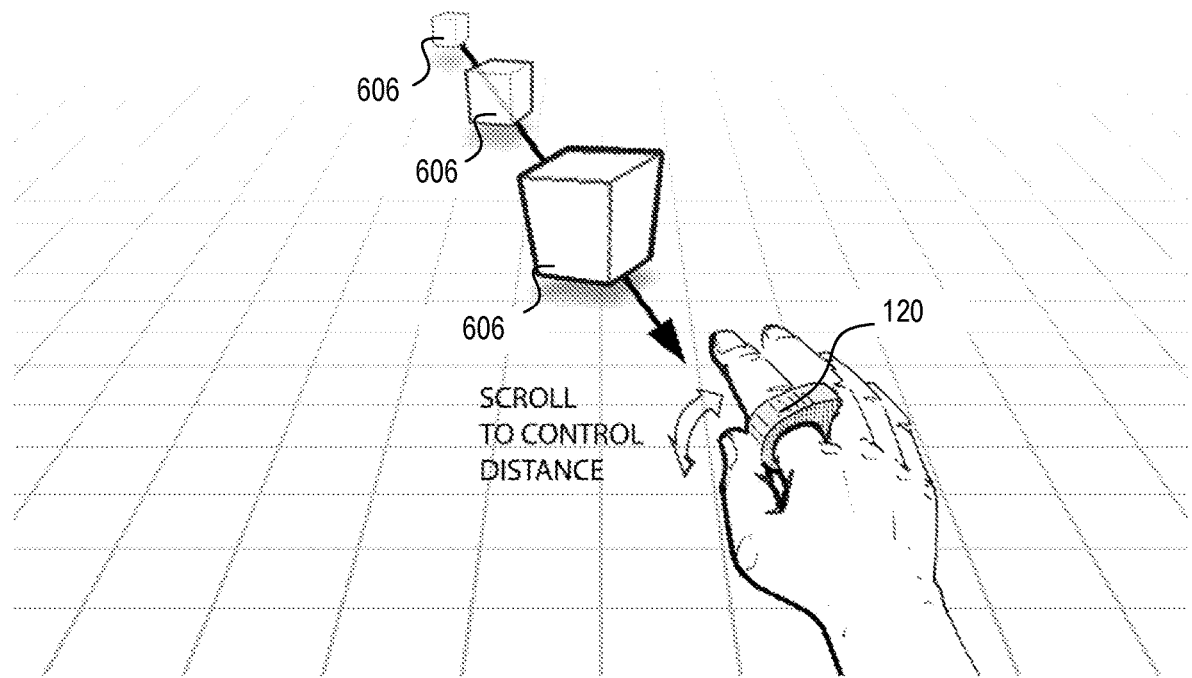

FIG. 6A-E graphically illustrate examples of interactions of a pointing controller 120 in a three-dimensional virtual environment 600. While the embodiments of FIGS. 6A-E illustrate a pointing controller 120 having a ring form factor, the interactions can similarly be executed using a pointing controller 120 with different form factors including those described herein. FIG. 6A illustrates tracking of a pointing vector in a three-dimensional space. Here, the display 232 presents a cursor 602 as a visual indicator of the pointing vector which comprises a line from the pointing controller 120 to the cursor 602. FIG. 6B illustrates selection of a virtual object 606 when the pointing vector intersects coordinates occupied by the virtual object 606. Here, a visual selection indicator 604 is presented to indicate that the object 606 is in a selected state. FIG. 6C illustrates the user performing a pinching gesture to cause the virtual object 606 to be placed into a grabbed state. FIG. 6D illustrates the user moving the hand while performing the pinching gesture. The motion of the pointing controller 120 is tracked and the position of the virtual object 606 in the grabbed state is updated to track the motion of the pointing controller 120, thus enabling the user to move the virtual object 606 through the virtual environment. FIG. 6E illustrates the user performing a swiping gesture when the virtual object 606 is in a grabbed state to cause the virtual object 606 to move along the pointing vector in a direction towards the pointing controller 120. Thus, the user can control the distance of the object in the virtual environment by use of the swiping gesture.

FIG. 7 illustrates an example of a pointing controller 720 in a ring form factor. The pointing controller 720 comprises an interior cutout 710 suitable to be worn on a finger (e.g., the index finger of the right hand). The outer surface of the pointing controller 720 includes a concave edge 702 on one side shaped appropriately to substantially conform to the side of an adjacent finger (e.g., the middle finger) to the finger wearing the ring. A convex edge 704 is formed on the side opposite the concave edge 702 and may be positioned adjacent to a thumb when the pointing controller 720 is worn on the index finger. Flat edges 706 connect the convex edge 704 and the concave edge 702 along the top and bottom surfaces respectively. Collectively, the convex edge 704 and flat edges 706 are oriented to form an approximately "horseshoe" shape. The flat edges 706 furthermore meet the concave edge 702 to form respective corners 712. This form factor enables the pointing controller 720 to be worn comfortably and securely on the index finger while enabling access to controls on the concave edge 702 using the middle finger and the convex edge 704 using the thumb. The ring can be worn on either the right hand or the left hand by merely rotating it 180 degrees.

FIG. 8 illustrates an embodiment of an internal layout of the pointing controller 720. The pointing controller 720 includes a flat board 802 (e.g., a rigid printed circuit board) having a shape approximately conforming to the above-described cross-section of the pointing controller 720. In an embodiment, the flat board 802 includes electronics such as the power sub-system 240, a haptic driver of the output devices 260 to drive a vibration motor 810, and the IMU 220. A riser board 804 (e.g., a rigid printed circuit board) is oriented substantially perpendicular to the flat printed circuit board 802 and positioned along one of the flat edges 706 adjacent to a respective corner 712. The riser board 804 may include the wireless interface 250, the output devices 260, and the control elements 230. The riser board 804 may be coupled to the flat board 802 via a right-angle board-to-board connector or a soldered edge connection. The battery 806 is coupled to the flat board 802 along the opposite flat edge 706 from the riser board 804 adjacent to the opposite corner 712. The touch board 808 wraps around the convex edge 704 from the riser board 804 towards the battery 806. The touch board 808 includes the touch sensitive pad of the slider control interface 232. A vibration motor 810 is coupled to an end of the touch board 808 adjacent to the battery 806. A force sensor 812 utilized for the inter-digit button 234 is positioned along the concave edge 702 and couples to the touch board 808 via a flexible cable 814.

FIG. 9 illustrates an internal case 900 for enclosing electronic components of the pointing controller 720. For structural support, the vibration motor 910 and force sensor 912 are supported by the internal case 900.

In alternative embodiments, other shapes and layouts are possible for a pointing controller 720 in a ring form factor. For example, in one alternative embodiment, a flex-rigid construction technique may be used to create a similar shape using a single printed circuit board that includes both rigid and flexible section. Here, a flexible board portion may be used to connect between a flat board portion and a riser board portion extended perpendicular from the flat board portion. In another embodiment, a stack of thin boards may be included to mount additional electronics while optimizing the available physical space. For example, a second flat board having a similar form factor as the flat board 802 may be placed on the opposite side of the pointing controller 720 on a plane substantially parallel to the plane of the flat board 802.

FIG. 10 illustrates a pointing controller 1020 held between an index finger and a middle finger. In use, the user may point the index and middle fingers in a direction of interest to perform actions in the virtual environment such as selecting virtual objects, moving virtual objects, or navigating through virtual menus. The pointing controller 1020 detects motion data from the IMU that enables the pointing direction to be detected for enabling the above-described interactions.

FIG. 11 illustrates an example form factor of the pointing controller 1020. The pointing controller 1020 comprises a chassis having a top plate 1114 and a bottom plate 1116 in planes substantially parallel to each other. The top plate 1114 and the bottom plate 116 are coupled by a connecting member 1118 centered along an axis perpendicular to the top plate 1114 and the bottom plate 1116 and intersecting approximate center points of the top plate 1114 and the bottom plate 1116. The connecting member 1118 may join the top plate 1114 and the bottom plate 1116 along curved surfaces to form a first finger pad 1110 between the top plate 1114 and the bottom plate 1116 on a first side of the pointing controller 120, and to form a second finger pad 1112 between the top plate and the bottom plate 1116 on a second side of the pointing controller 120. The first and second finger pads 1110, 1112 each comprise concave surfaces suitable for partially encircling adjacent fingers of a user (e.g., an index finger and middle finger) in the manner shown in FIG. 10. The finger pads 1110, 1112 may be coated with, or constructed of, a tactile surface such as molded silicone to provide the user with a comfortable feel.

FIG. 12 illustrates an embodiment of an internal layout of the pointing controller 1020 with the chassis removed. The pointing controller 1020 includes a first finger pad 1210 and a second finger pad 1212 each comprising a substantially open cup-shaped concave surface with the open ends oriented in opposite directions. An inter-digit button 1214 (e.g., a force sensor, strain gauge, capacitive deflection mechanism, or inductive coil detecting metal surface) is positioned between the first finger pad 1210 and the second finger pad 1212. When the first finger pad 1210 and the second finger pad 1212 are squeezed together, the pads apply pressure to the force sensor 1214, which measures the applied pressure. A battery 1202 may be positioned along the top plate 1114 of the pointing controller 120 to provide power to various components of the pointing controller 120. A haptic motor 1204 may be placed under the battery 1202 in a central area of the top plate 1114. A touch-sensitive surface 1208 is positioned along the bottom plate 1116 to detect a touch location and may be utilized in the slider control interface 232. In an embodiment, the touch-sensitive elements may be mounted on the bottom of the main PCB 1206, which is bonded to plastic or glass. The main printed circuit board (PCB) 1206 may also be placed along the bottom plate 1116 inside of the touch-sensitive surface 1208. The PCB 1206 may include the control unit 210, wireless interface 250, and other control elements of the pointing controller 120. In an embodiment, a flexible PCB (not shown) connects the battery 1202 and haptic motor 1204 to the main PCB 1206 and may also include status LEDs visible through the top surface of the top plate 1114.

FIG. 13 illustrates a form factor of the docking station 140. The docking station 140 may include an enclosure with a molded cut-out that may be substantially form-fitted with the pointing controller 1120.

Additional Considerations

As illustrated, the pointing controller 120 and display device 110 enable intuitive interactions with virtual objects through movement of the pointing controller 120 and a few simple gestures. The pointing controller 120 thus provides a lightweight and easy to operate controller for interacting with a virtual or augmented reality environment. Furthermore, the pointing controller 120 enables interactions without requiring large gestures with raised arms necessitated by conventional controllers.

In alternative embodiments, one or more components of the control processing module 324 may be implemented on the pointing controller 120 instead of on the display device 110. For example, in an embodiment, the functions of the tracking module 402 and gesture recognition module 406 may instead be performed by the pointing controller 120. In this embodiment, the tracking results and the detected gestures may be communicated directly to the display device 110 instead of communicating the raw IMU and control element data. Alternatively, in other embodiments, one or more components of the control processing module 324 may be implemented on a separate communicatively coupled device. For example, a mobile device, personal computer, or game console may receive raw IMU and control element data from the pointing controller 120, perform the functions of the control processing module 324 to process the raw data, and send processed control information to a display device 110 to cause the display device 110 to update the display on the display device 352. In yet another embodiment, one or more components of the control processing module 324 may be performed on a remote server (e.g., a cloud server) communicatively coupled to the pointing controller 120 and the display device 110.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements that are not in direct contact with each other, but yet still co-operate or interact with each other.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the scope.

The invention claimed is:

1. A method for controlling interactions with virtual objects using a
    pointing controller, the method comprising:
    obtaining sensor data from an inertial measurement unit of the pointing controller;
    tracking movement of a pointing vector through a three-dimensional virtual space based on the inertial measurement unit and a stored arm model by:
        detecting whether the pointing controller is indoors or outdoors; and
        adjusting parameters of the arm model depending on whether the pointing controller is indoors or outdoors;
    detecting an intersection of the pointing vector with coordinates occupied by a virtual object in the three-dimensional virtual space to place the virtual object in a selected state;
    detecting a first interaction with the pointing controller while the virtual object is in the selected state;
    placing the virtual object in a grabbed state in response to the first interaction;
    causing position of the virtual object to track movement of the pointing controller while the virtual object is in the grabbed state;
    detecting a second interaction with the virtual object while the virtual object is in the grabbed state;
    placing the virtual object in a free state in response to the second interaction; and
    causing the virtual object to stop tracking movement of the pointing vector in response to the second interaction.

2. The method of claim 1, wherein detecting the first intersection comprises:
    generating a pointing cone having a central axis aligned with the pointing vector, and
        origin proximate to a location of the pointing controller, and a radius that
        increases with distance from the origin of the pointing vector; and
    detecting the intersection with the pointing vector responsive to the pointing cone overlapping with coordinates occupied by the virtual object.

3. The method of claim 1, wherein the first interaction comprises a pinching gesture,
    the pinching gesture detected in response to detecting a touch with an inter-digit button of
    the pointing controller on a first side of the ring controller.

4. The method of claim 3, wherein the second interaction comprises
    a release of the pinching gesture, the release of the pinching gesture detected in response
    to detecting a release of the touch with the inter-digit button of the pointing controller.

5. The method of claim 1, further comprising:
    while the virtual object is in the grabbed state, detecting a swiping gesture on a slider control interface of the pointing controller; and
    causing the virtual object to move along the pointing vector in a direction associated with the swiping gesture.

6. The method of claim 1, wherein tracking the movement of the pointing
    vector comprises:
    detecting whether the user of the pointing controller is sitting or standing; and
    adjusting parameters of the arm model depending on whether the user of the pointing controller is sitting or standing.

7. The method of claim 1, wherein tracking the movement of the pointing
    vector comprises:
    detecting a fatigue level associated with the user of the pointing controller; and
    adjusting parameters of the arm model depending on the detected fatigue level.

8. A non-transitory computer-readable storage medium storing
    instructions for controlling interactions with virtual objects using a pointing controller,
    the instructions when executed by a processor causing the processor to perform steps
    comprising:
    obtaining sensor data from an inertial measurement unit of the pointing controller;
    tracking movement of a pointing vector through a three-dimensional virtual space based on the inertial measurement unit and a stored arm model by:
        detecting whether a user of the pointing controller is sitting or standing; and
        adjusting parameters of the arm model depending on whether the user of the pointing controller is sitting or standing;
    detecting an intersection of the pointing vector with coordinates occupied by a virtual object in the three-dimensional virtual space to place the virtual object in a selected state;
    detecting a first interaction with the pointing controller while the virtual object is in the selected state;

placing the virtual object in a grabbed state in response to the first interaction;

causing position of the virtual object to track movement of the pointing controller while the virtual object is in the grabbed state;

detecting a second interaction with the virtual object while the virtual object is in the grabbed state;

placing the virtual object in a free state in response to the second interaction; and causing the virtual object to stop tracking movement of the pointing vector in response to the second interaction.

9. The non-transitory computer-readable storage medium of claim 8, wherein detecting the first intersection comprises:

generating a pointing cone having a central axis aligned with the pointing vector, and origin proximate to a location of the pointing controller, and a radius that increases with distance from the origin of the pointing vector; and detecting the intersection with the pointing vector responsive to the pointing cone overlapping with coordinates occupied by the virtual object.

10. The non-transitory computer-readable storage medium of claim 8, wherein the first interaction comprises a pinching gesture, the pinching gesture detected in response to detecting a touch with an inter-digit button of the pointing controller on a first side of the ring controller.

11. The non-transitory computer-readable storage medium of claim 10, wherein the second interaction comprises a release of the pinching gesture, the release of the pinching gesture detected in response to detecting a release of the touch with the inter-digit button of the pointing controller.

12. The non-transitory computer-readable storage medium of claim 8, further comprising:

while the virtual object is in the grabbed state, detecting a swiping gesture on a slider control interface of the pointing controller; and causing the virtual object to move along the pointing vector in a direction associated with the swiping gesture.

13. The non-transitory computer-readable storage medium of claim 8, wherein tracking the movement of the pointing vector comprises:

detecting whether the pointing controller is indoors or outdoors; and adjusting parameters of the arm model depending on whether the pointing controller is indoors or outdoors.

14. The non-transitory computer-readable storage medium of claim 8, wherein tracking the movement of the pointing vector comprises:

detecting a fatigue level associated with the user of the pointing controller; and adjusting parameters of the arm model depending on the detected fatigue level.

15. A computing device for controlling interactions with virtual objects using a pointing controller, the computing device comprising:

a processor; and a non-transitory computer-readable storage medium storing instructions for controlling interactions with virtual objects using a pointing controller, the instructions when executed by a processor causing the processor to perform steps comprising:

obtaining sensor data from an inertial measurement unit of the pointing controller;

tracking movement of a pointing vector through a three-dimensional virtual space based on the inertial measurement unit and a stored arm model by:

detecting a fatigue level associated with a user of the pointing controller; and adjusting parameters of the arm model depending on the detected fatigue level;

detecting an intersection of the pointing vector with coordinates occupied by a virtual object in the three-dimensional virtual space to place the virtual object in a selected state;

detecting a first interaction with the pointing controller while the virtual object is in the selected state;

placing the virtual object in a grabbed state in response to the first interaction;

causing position of the virtual object to track movement of the pointing controller while the virtual object is in the grabbed state;

detecting a second interaction with the virtual object while the virtual object is in the grabbed state;

placing the virtual object in a free state in response to the second interaction; and causing the virtual object to stop tracking movement of the pointing vector in response to the second interaction.

16. The computing device of claim 15, wherein tracking the movement of the pointing vector comprises:

detecting whether the pointing controller is indoors or outdoors; and adjusting parameters of the arm model depending on whether the pointing controller is indoors or outdoors.

17. The computing device of claim 15, wherein tracking the movement of the pointing vector comprises:

detecting whether the user of the pointing controller is sitting or standing; and adjusting parameters of the arm model depending on whether the user of the pointing controller is sitting or standing.

18. The method of claim 1, wherein to detect whether the pointing controller is indoors or outdoors the method further comprises determining a proximity of at least one planar surface to the pointing controller.

19. The non-transitory computer-readable storage medium of claim 8, wherein detecting whether the user of the pointing controller is sitting or standing comprises determining a height of a display device with respect to ground and comparing the height of the display device to a height of the user.

20. The computing device of claim 15, wherein detecting the fatigue level associated with the user of the pointing controller comprises tracking an amount of time the user spends with the user's wrist above a threshold height, wherein the level of fatigue increases with time of the user's wrist above the threshold height.

* * * * *